United States Patent
Lu et al.

(10) Patent No.: US 11,902,455 B2
(45) Date of Patent: *Feb. 13, 2024

(54) METHOD AND APPARATUS FOR NOISE INJECTION FOR PUF GENERATOR CHARACTERIZATION

(71) Applicant: Taiwan Semiconductor Manufacturing Co., Ltd., Hsin-Chu (TW)

(72) Inventors: Shih-Lien Linus Lu, Hsinchu (TW); Cheng-En Lee, Hinchu (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 298 days.

This patent is subject to a terminal disclaimer.

(21) Appl. No.: 17/208,894

(22) Filed: Mar. 22, 2021

(65) Prior Publication Data
US 2021/0211312 A1    Jul. 8, 2021

Related U.S. Application Data

(63) Continuation of application No. 16/026,409, filed on Jul. 3, 2018, now Pat. No. 10,958,453.

(51) Int. Cl.
*H04L 9/32* (2006.01)
*H04L 9/34* (2006.01)
(Continued)

(52) U.S. Cl.
CPC ........... *H04L 9/3278* (2013.01); *G06F 21/75* (2013.01); *G11C 11/419* (2013.01); *H03K 3/0315* (2013.01)

(58) Field of Classification Search
CPC .......... G06F 21/75; G06F 21/83; G06F 21/86; G06F 21/64; G06F 21/87; G06F 21/70; H04L 9/3278
(Continued)

(56) References Cited

U.S. PATENT DOCUMENTS

| 4,796,227 A | * | 1/1989 | Lyon | ........................ | G11C 8/10 |
| | | | | | 365/156 |
| 8,767,445 B2 | * | 7/2014 | Chellappa | .............. | G11C 5/005 |
| | | | | | 365/230.08 |

(Continued)

OTHER PUBLICATIONS

Lu, S.L., "Implementation of Iterative Networks with CMOS Differential Logic", IEEE Journal of Solid-State Circuits, Aug. 1988, 23(4):1013-1017.

*Primary Examiner* — Haresh N Patel
(74) *Attorney, Agent, or Firm* — Duane Morris LLP

(57) ABSTRACT

Disclosed is a physical unclonable function generator circuit and method. In one embodiment, physical unclonable function (PUF) generator includes: a PUF cell array that comprises a plurality of bit cells, wherein each of the plurality of bit cells comprises at least two access transistors, at least one enable transistor, and at least two storage nodes, wherein the at least two storage nodes are pre-configured with substantially the same voltages allowing each of the plurality of bit cells having a first metastable logical state; a PUF control circuit coupled to the PUF cell array, wherein the PUF control circuit is configured to access the plurality of bit cells to determine second logical states by turning on the at least one enable transistor and turning off the at least two access transistors of each of the plurality of bit cells, and based on the second logical states of the plurality of bit cells, to generate a PUF output; and a noise injector coupled to the PUF control circuit and the PUF cell array, wherein the noise injector is configured to create stressed operation conditions to evaluate stability of the plurality of bit cells.

20 Claims, 13 Drawing Sheets

(51) Int. Cl.
  *G06F 21/75* (2013.01)
  *H03K 3/03* (2006.01)
  *G11C 11/419* (2006.01)

(58) Field of Classification Search
  USPC .......................................................... 726/34
  See application file for complete search history.

(56) References Cited

U.S. PATENT DOCUMENTS

| | | | | |
|---|---|---|---|---|
| 8,981,810 | B1* | 3/2015 | Trimberger | H03K 19/003 |
| | | | | 326/8 |
| 9,279,850 | B1* | 3/2016 | Pedersen | G01R 27/2605 |
| 9,335,972 | B2* | 5/2016 | Yang | H03K 3/84 |
| 9,947,391 | B1* | 4/2018 | Mahatme | G11C 11/419 |
| 10,164,640 | B1* | 12/2018 | Lu | G11C 16/045 |
| 10,311,930 | B1* | 6/2019 | Kim | H04L 9/3278 |
| 10,483,971 | B1* | 11/2019 | Lu | G06F 30/398 |
| 10,958,453 | B2* | 3/2021 | Lu | G06F 21/73 |
| 2003/0227041 | A1* | 12/2003 | Atwood | G11C 11/4076 |
| | | | | 257/908 |
| 2011/0299678 | A1* | 12/2011 | Deas | H04L 9/003 |
| | | | | 380/28 |
| 2012/0119783 | A1* | 5/2012 | Jung | H03K 3/356156 |
| | | | | 326/58 |
| 2012/0230087 | A1* | 9/2012 | Chellappa | G11C 11/413 |
| | | | | 365/154 |
| 2013/0019324 | A1* | 1/2013 | Tehranipoor | H03K 3/0315 |
| | | | | 726/34 |
| 2014/0108786 | A1* | 4/2014 | Kreft | G06Q 20/3825 |
| | | | | 713/194 |
| 2015/0098268 | A1* | 4/2015 | Yabuuchi | G11C 11/418 |
| | | | | 365/154 |
| 2016/0285639 | A1* | 9/2016 | Mathew | G06Q 10/08 |
| 2017/0017808 | A1* | 1/2017 | Kwong | H04L 9/3278 |
| 2017/0038807 | A1* | 2/2017 | Bittlestone | G06F 21/73 |
| 2017/0046129 | A1* | 2/2017 | Cambou | G09C 1/00 |
| 2017/0048072 | A1* | 2/2017 | Cambou | G11C 15/046 |
| 2017/0140812 | A1* | 5/2017 | Yamamoto | H10B 10/18 |
| 2018/0091293 | A1* | 3/2018 | Suresh | H03K 19/003 |
| 2018/0102907 | A1* | 4/2018 | Lin | G06F 21/44 |
| 2018/0166400 | A1* | 6/2018 | Wang | H04L 9/3278 |
| 2018/0293052 | A1* | 10/2018 | Suresh | H04L 9/0866 |
| 2019/0114097 | A1* | 4/2019 | Tran | H01L 29/42328 |
| 2019/0304527 | A1* | 10/2019 | Kim | H10N 50/10 |
| 2019/0305971 | A1* | 10/2019 | Li | G11C 7/02 |
| 2019/0319810 | A1* | 10/2019 | Lu | G11C 11/417 |
| 2019/0342106 | A1* | 11/2019 | Li | G11C 7/24 |
| 2019/0378575 | A1* | 12/2019 | Lu | H04L 9/3247 |
| 2019/0392179 | A1* | 12/2019 | Lu | G11C 8/10 |
| 2020/0014547 | A1* | 1/2020 | Lu | H03K 3/84 |
| 2020/0034549 | A1* | 1/2020 | Lu | H04L 9/30 |
| 2020/0052912 | A1* | 2/2020 | Lu | G06F 8/65 |
| 2020/0169423 | A1* | 5/2020 | Cambou | H04L 9/0866 |

* cited by examiner

METHOD AND APPARATUS FOR NOISE INJECTION FOR PUF GENERATOR CHARACTERIZATION

RELATED APPLICATIONS

This application is a continuation of U.S. patent application Ser. No. 16/026,409, filed Jul. 3, 2018, now U.S. Pat. No. 10,958,453, which is expressly incorporated by reference herein in its entirety.

BACKGROUND

With the increasing use of integrated circuits in electronic devices that provide different types of information for a variety of different applications, there has been an increasing need to protect sensitive and/or critical information that may be stored within an electronic device to limit access to such information to only other devices that have permission to access the information. Some examples of such applications include the authentication of devices, protection of confidential information within a device, and securing a communication between two or more devices.

A physically unclonable function (PUF) generator is a physical structure generally within an integrated circuit that provides a number of corresponding outputs (e.g., responses) in response to inputs (e.g., challenges/requests) to the PUF generator. The PUF generator provides one or more sets of challenge response pairs (CRPs). A unique identity of the integrated circuit may be established by such CRPs provided by the PUF generator. With the establishment of the identity, secure communication can be guaranteed. The PUF generator can also be used for existing authentication purposes to replace the current method of assigning an identity to an electronic device. Since the PUF generator is based on intrinsic properties of a manufacturing process, the PUF has various advantages over conventional authentication approaches that inscribes an identity on a device which may be mimicked and/or reverse engineered more easily. However, such inherent variation may be affected by dynamic noise resulting in an unpredictable behavior of a PUF generator. There exists a need to develop a method to quickly evaluate stability of bit cells in the PUF generator in order to mask those that are unpredictable and filter out unstable bit cells in the PUF generator to produce unique, unclonable and reliable PUF signatures.

BRIEF DESCRIPTION OF THE DRAWINGS

Aspects of the present disclosure are best understood from the following detailed description when read with the accompanying figures. It is noted that various features are not necessarily drawn to scale. In fact, the dimensions and geometries of the various features may be arbitrarily increased or reduced for clarity of illustration.

DETAILED DESCRIPTION OF EXEMPLARY EMBODIMENTS

The following disclosure describes various exemplary embodiments for implementing different features of the subject matter. Specific examples of components and arrangements are described below to simplify the present disclosure. These are, of course, merely examples and are not intended to be limiting. For example, it will be understood that when an element is referred to as being "connected to" or "coupled to" another element, it may be directly connected to or coupled to the other element, or one or more intervening elements may be present.

In an example of using the manufacturing variability of each bit cell across a memory-based PUF generator to generate a PUF signature. That is, intrinsic tendency of each bit cell caused by aforementioned variations in parameters through fundamentally uncontrollable physical effects and non-uniformity due to manufacturing process may be harvested to determine the bit value. Sometimes the variation may be small but other times the variation is large. The stability of a bit cell to generate the same response can be determined according to the techniques in the present disclosure to determine whether such a bit cell is suitable to provide a reliable PUF signature. It is understood that even though an SRAM device includes symmetric cells (bit cells) in design, one or more manufacturing variabilities may still cause each bit cell of the SRAM device to be unique and one of its uniqueness is intrinsically tend to be at a high state (i.e., a logical "1") or at a low state (i.e., a logical "0") while the SRAM device is initialized (e.g., powered-on). In other words, each bit cell may have an intrinsic tendency to go into either a logical "1" or a logical "0", and moreover, some bit cells may have a strong intrinsic tendency and some bit cells may have a weak intrinsic tendency. When a bit cell has a strong intrinsic tendency, the bit cell tends to go to its "preferred" logical state when a transition happens. In some embodiments, such a bit cell may be referred to as a "stable bit cell". When a bit cell has a weak intrinsic tendency, the bit cell does not have a strong tendency toward a "preferred" logical state. That is, the bit cell with weak intrinsic tendency may sometimes present (e.g., remain at or transition to) a high state and sometimes present (e.g., remain at or transition to) a low state without statistic preference when the memory-based PUF generator is accessed. In some embodiments, such a bit cell may be referred to as an "unstable bit cell". This disclosure presents various embodiments for characterization and evaluation of the stability of bit cells and identification of unstable bit cells in the PUF generator and further generation of a PUF signature only based on stable bit cells.

Figure 1:
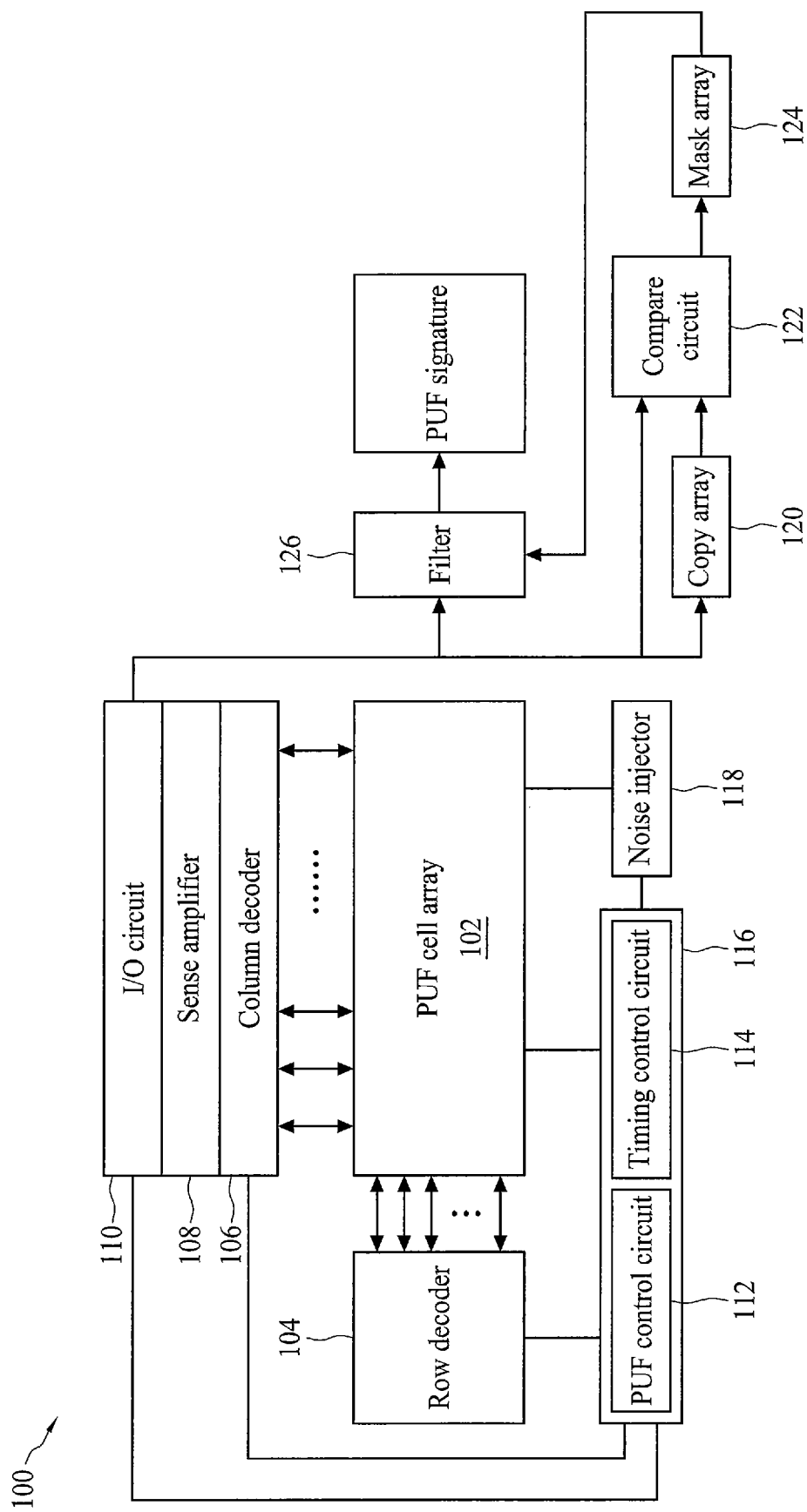
FIG. 1 illustrates an exemplary block diagram of a PUF generator, in accordance with various embodiments of present disclosure.

FIG. 1 illustrates an exemplary block diagram of a PUF generator 100, in accordance with some embodiments of present disclosure. It is noted that the PUF generator 100 is merely an example, and is not intended to limit the present disclosure. Accordingly, it is understood that additional functional blocks may be provided in or coupled to the PUF generator 100 of FIG. 1, and that some other functional blocks may only be briefly described herein.

In the illustrated embodiment of FIG. 1, the PUF generator 100 comprises a PUF cell array 102, a row decoder 104, and a column decoder 106, that are coupled to a plurality of bit cells in the PUF cell array 102. The PUF generator 100 further comprises a sense amplifier 108, an input/output (I/O) circuit 110, a PUF control circuit 112 and a timing control circuit 114, in the illustrated embodiment. All the components may be coupled to each other and further to the PUF control circuit 112 in the authentication circuit 116. The PUF generator 100 further comprises a noise injector 118, which is coupled to the authentication circuit 116. In some embodiments, the noise injector 118 is controlled by the PUF control circuit 112 to introduce noise directly into the plurality of bit cells to create "stressed" operation conditions. In some embodiments, such "stressed" operation conditions are used to expedite the identification of unstable bit cells which do not provide constant logical states. In the illustrated embodiment as shown in FIG. 1, the PUF generator 100 further comprises a copy array 120, a comparing circuit 122, a mask array 124, and a filter 126. In some embodiments, the copy array 120, the comparing circuit 122 and the filter 126 are directly coupled to the I/O circuit 110.

The authentication circuit 116 is configured to receive a request/challenge through the I/O circuit 110 (e.g., a request to power on the coupled PUF cell array 102, a request to access the PUF signature of the PUF cell array 102, etc.). In some embodiments, the authentication circuit 116 is configured to transmit a response based on the logical states of the bit cells of the PUF cell array 102 through the I/O circuit 110 (e.g., a PUF output) to the filter 126 or the copy array 120 in response to the request. In some embodiments, such I/O circuit 110 may be directly coupled to the PUF control circuit 112 of the authentication circuit 116. The PUF control circuit 112 is configured to control (e.g., increase or decrease) a voltage level of a supply voltage applied at each of the bit cells, control (e.g., increase or decrease) a voltage level applied at each of the WL and the WLB. In some embodiments, the PUF control circuit 112 may enable the voltage supply to at least one selected column and at least one selected row. Further, the PUF control circuit 112 may switch between the evaluation mode and the normal operation mode. The PUF control circuit 112 may also introduce noise. In some embodiments, the PUF control circuit 112 may control a periodic reading of logical states of the bit cells. These are described in further detail below with respect to FIG. 4. In some alternative embodiments, the PUF control circuit 112 may be implemented as a separate block, which is not embedded in the PUF cell array 102. In some embodiments, the PUF control circuit 112 can be embedded in the PUF cell array 102. In some embodiments, the timing control circuit 114 provide control and synchronization on pulse signals during read and write processes. In some embodiments, all the components of the authentication circuit 116 (i.e., the PUF control circuit 112 and timing control circuit 114) may be coupled to a common data bus for inter-communication.

The PUF cell array 102 includes a plurality of bit cells that are arranged in a column-row configuration in which each column has a bit line (BL) and a bit line bar (BLB), each row has a word line (WL) and a word line bar (WLB). More specifically, the BL and BLB of each column are respectively coupled to a plurality of bit cells that are disposed in that column, and each memory cell in that column is arranged on a different row and coupled to a respective (different) WL and a respective (different) WLB. That is, each bit cell of the PUF cell array 102 is coupled to a BL of a column of the PUF cell array 102, a BLB of the column of the PUF cell array 102, a WL of a row of the PUF cell array 102 and a WLB of a row of the PUF cell array 102. In some embodiments, the BL's and BLb's are arranged in parallel vertically and the WL's and WLB's are arranged in parallel horizontally (i.e., perpendicular to the BL's and BBL's). In some embodiments, WL and WLB for each row of bit cells in the PUF cell array 102 are connected together. In some embodiments, as discussed in further detail in FIGS. 2 and 4, the PUF cell array 102 can further includes a bit pre-charge line (BPC), a PUF output, and a PUF output bar for each row of bit cells. An illustrated embodiment of the PUF cell array 102 will be provided in further detail below with reference to FIG. 2.

In one illustrated embodiment, each of the bit cells of the PUF cell array 102 comprises a 14-transistors (14T-SRAM) bit cell, which will be described in further detail below in FIG. 4. However, the bit cells of the PUF cell array 102 may be implemented as any of a variety of types of memory cells such as, for example, 2T-2R SRAM bit cell, 4T-SRAM bit cell, 8T-SRAM bit cell, DRAM bit cells, etc., according to some embodiments of present disclosure.

The row decoder 104 is configured to receive a row address of the PUF cell array 102 and apply a WL and/or a WLB at that row address. In some embodiments, the column decoder 106 may be optional. The column decoder 106 is configured to receive a column address of the PUF cell array 102 and apply a BL and/or BLB at that column address. The sense amplifier 108 and I/O circuit 110 are configured to access a logical state (i.e., a logical "1" or a logical "0") at each of the bit cells in the PUF cell array 102. In some embodiments, a logical state of a bit cell may be written to or read from a bit cell by the I/O circuit 110. As described above, in some embodiments, the PUF control circuit 112 is coupled to all the components and configured to control the coupled components.

In order to improve the error rate, the masking and filter circuit can be used to evaluate and characterize all the bit cells in the PUF cell array 102 over multiple times of evaluation trials and to filter out unstable/unpredictable bit cells in the PUF cell array 102 in order to generate a stable PUF signature. In particular, when the initial PUF output from all the bit cells of the PUF cell array 102 is generated, it is first stored in a copy array 120 through the I/O circuit 110. In some embodiments, the copy array 120 can be implemented with any type of on-chip memory design, including on-chip SRAMs. In some embodiments, the copy array 120 comprises on-chip memory array that contains the same number of bits as the number of bit cells in the PUF cell array 102 of the PUF generator 100. During an evaluation process, a second PUF output from the bit cells of the PUF cell array 102 is generated by injecting noise to the authentication circuit 116 using the noise injector 118 creating a "stressed" operation condition. The second PUF output is then compared to the initial PUF output in a compare circuit 122. Unstable bit cells with different logical states in the two PUF outputs during the evaluation process are then identified and their addresses are stored in a mask array 124. This evaluation process repeats to acquire multiple PUF outputs during multiple iterations under the same or different stressed operation conditions. During a normal operation, the mask array 124 is then coupled to the filter 126, which selects stable bit cells that are not marked by the mask array 124 and their logical states as the PUF signature.

In some embodiments, the PUF control circuit 112 comprises a finite state machine (FSM), which is not shown in FIG. 1. The FSM of the PUF control circuit 112 may comprise a plurality of dynamic flip-flop (DFF) circuits, a population counter (Popcount), and an evaluation logic circuit, which are not shown in FIG. 1. In some embodiments, the FSM is used to determine the logic states of the plurality of bit cells in the PUF cell array 102 to determine the total number of bit cells that have flipped logic states to generate a PUF signature.

In some embodiments, in response to a challenge received which in a PUF generator 100 is an address, the authentication circuit 116 and the noise injector 118 are configured to perform at least one of the techniques described in detail below. Once the stability of each bit cell across the PUF cell array 102 is determined by the copy array 120, compare circuit 122 and the mask array 124 during the evaluation process, in some embodiments, the PUF control circuit 112 may switch from the evaluation mode (stressed operation condition) to the normal operation mode by switching off the noise injector 118, during which the filter 126 directly receives the PUF output generated from the bit cells in the PUF cell array 102 and selects the stable bit cells according to the mask array 124. The preferred logical states of the stable bit cells in the PUF cell array 102 after filtering are then used to generate a final PUF signature. In some embodiments, the final PUF signature comprises an N-bit response and the initial PUF signature comprises a M-bit response, wherein N≤M, N and M are positive integers. As described above, each bit cell's intrinsic tendency (i.e., either a strong or a weak intrinsic tendency) is identified efficiently and effectively by the proposed PUF generator 100. Specifically, this evaluation process to identify unstable bit cells in the PUF cell array 102 is accelerated by the noise injector 118 based on various disclosed techniques.

Figure 2:
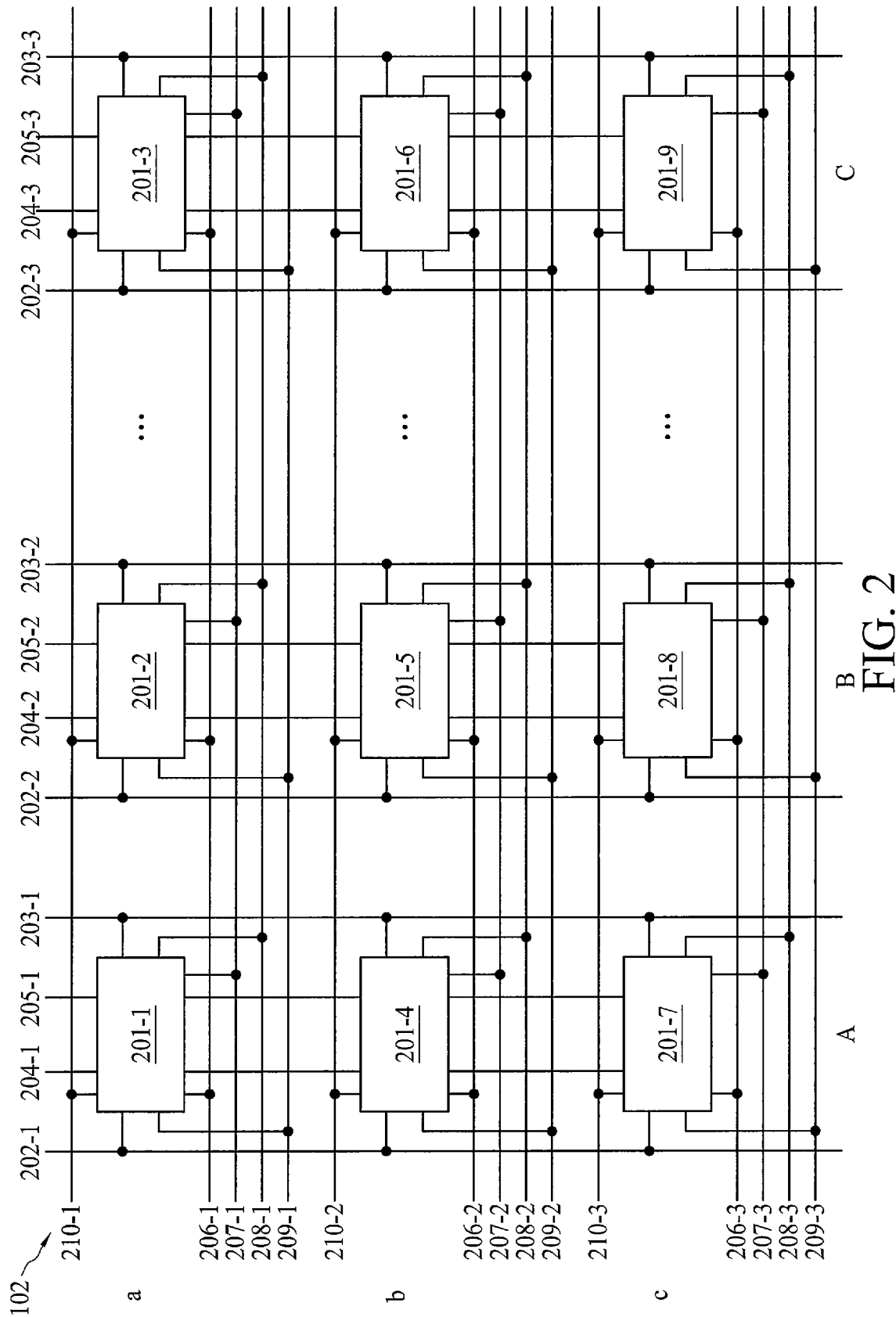
FIG. 2 illustrates an exemplary circuit diagram of a PUF cell array comprising a plurality of bit cells, in accordance with various embodiments of present disclosure.

FIG. 2 illustrates an exemplary circuit diagram of a PUF cell array 102 comprising a plurality of bit cells, in accordance with some embodiments of present disclosure. In some embodiments, the PUF cell array 102 includes a plurality of bit cells 201-1, 201-2, 201-3, 201-4, 201-5, 201-6, 201-7, 201-8, and up to 201-9. Although only 9 bit cells are shown, any desired number of bit cells may be included in the PUF cell array 102 while remaining within the scope of the present disclosure. As described above, the bit cells 201-1, 201-2, 201-3, 201-4, 201-5, 201-6, 201-7, 201-8, and 201-9 are arranged in a column-row configuration. More specifically, in some embodiments, the PUF cell array 102 includes bit lines (BL's) 202-1, 202-2, and 202-3 arranged in parallel, bit line bars (BLB's) 203-1, 203-2, and 203-3 also arranged in parallel, word lines (WL's) 206-1, 206-2, and 206-3, and word line bars (WLB's) 207-1, 207-2 and 207-3. The WL's and WLB's are arranged in parallel orthogonally to the BL's and BLB's. In some embodiments, WL's 206 is coupled to the corresponding WLB's 207. In some embodiments, the PUF cell array 102 also includes positive supply voltage power 204-1, 204-2, and 204-3, and zero voltage reference 205-1, 205-2 and 205-3. As such, the PUF cell array 102 may include a first plurality of columns (e.g, arranged vertically), a second plurality of rows (e.g., arranged horizontally), wherein each column includes a respective pair of BL 202, BLB 203, power supply voltage 204, zero voltage reference 205, and each row includes a respective WL 206 and a respective WLB 207. In the illustrated embodiments, the PUF cell array 102 may also include PUF output 208-1, 208-2, and 208-3, and PUF output bar 209-1, 209-2, and 209-3, which are directly coupled to storage nodes in the bit cell through a respective inverter. Further, the PUF cell array 102 may also include bit pre-charge line (BPC) 210-1, 210-2 and 210-3, which is used to enable or disable the power supply voltage supply 204 to cross-coupled inverters of the bit cell, which are discussed in detail in FIG. 4.

For example, as shown in the illustrated embodiment of FIG. 2, the PUF cell array 102 includes columns "A," "B," and "C," and rows "a," "b," and "c," wherein column A includes respective BL 202-1, BLB 203-1, power supply voltage 204-1 and zero voltage reference 205-1; column B includes respective BL 202-2, BLB 203-2, power supply voltage 204-2 and zero voltage reference 205-2; column C includes respective BL 202-3, BLB 203-3, power supply voltage 204-3 and zero voltage reference 205-3; row a includes a respective WL 206-1, WLB 207-1, BPC 210-1, PUF output 208-1, PUF output bar 209-1; row b includes a respective WL 206-2, WLB 207-2, BPC 210-2, PUF output 208-2, PUF output bar 209-2; and row c includes a respective WL 206-3, WLB 207-3, BPC 210-3, PUF output 208-3, PUF output bar 209-3.

Moreover, each column includes one or more bit cells that are each coupled to the column's respective BL and BLB, a different separate WL, WLB, BPC, PUF output, and PUF output bar. For example, column A includes bit cells 200-1, 200-4, and 200-7, wherein the bit cells 200-1, 200-4, and 200-7 are each coupled to the BL 202-1, BLB 203-1, power supply voltage 204-1, zero voltage reference 205-1, WL's 206-1, 206-2, and 206-3, WLB's 207-1, 207-2, and 207-3, BPC's 210-1, 210-2, and 210-3, PUF output 208-1, 208-2, and 208-3; and PUF output bar 209-1, 209-2, and 209-3, respectively; column B includes bit cells 200-2, 200-5, and 200-8, wherein the bit cells 200-2, 200-5, and 200-8 are each coupled to the BL 202-2, BLB 203-2, power supply voltage 204-2, zero voltage reference 205-2, WL's 206-1, 206-2, and 206-3, WLB's 207-1, 207-2, and 207-3, BPC's 210-1, 210-2, and 210-3, PUF output 208-1, 208-2, and 208-3; and PUF output bar 209-1, 209-2, and 209-3, respectively; and column C includes bit cells 200-3, 200-6, and 200-9, wherein the bit cells 200-3, 200-6, and 200-9 are each coupled to the BL 202-3, BLB 203-3, power supply voltage 204-3, zero voltage reference 205-3, WL's 206-1, 206-2, and 206-3, WLB's 207-1, 207-2, and 207-3, BPC's 210-1, 210-2, and 210-3, PUF output 208-1, 208-2, and 208-3; and PUF output bar 209-1, 209-2, and 209-3, respectively.

As described above, each bit cell of the PUF cell array 102 (e.g., 201-1, 200-2, 201-3, 201-4, 200-5, 201-6, 200-7, 201-8, 201-9, etc.) may include a plurality of transistors (e.g., six MOSFET's for a 6T-SRAM bit cell, eight MOSFET's for an 8T-SRAM bit, three MOSFET's for an 3T-DRAM bit, twelve MOSFET's for an 12T-SRAM bit, etc.). In some embodiments, a logical state stored in each bit cell may be written to the bit cell by applying either a high state (i.e., a logical "1") or a low state (i.e., a logical "0") through a corresponding BL, BLB, WL, and WLB. In some embodiments, a stable logical state of a bit cell can be achieved after stabilizing from a metastable logical state due to intrinsic differences in the bit cell.

Figure 3A:
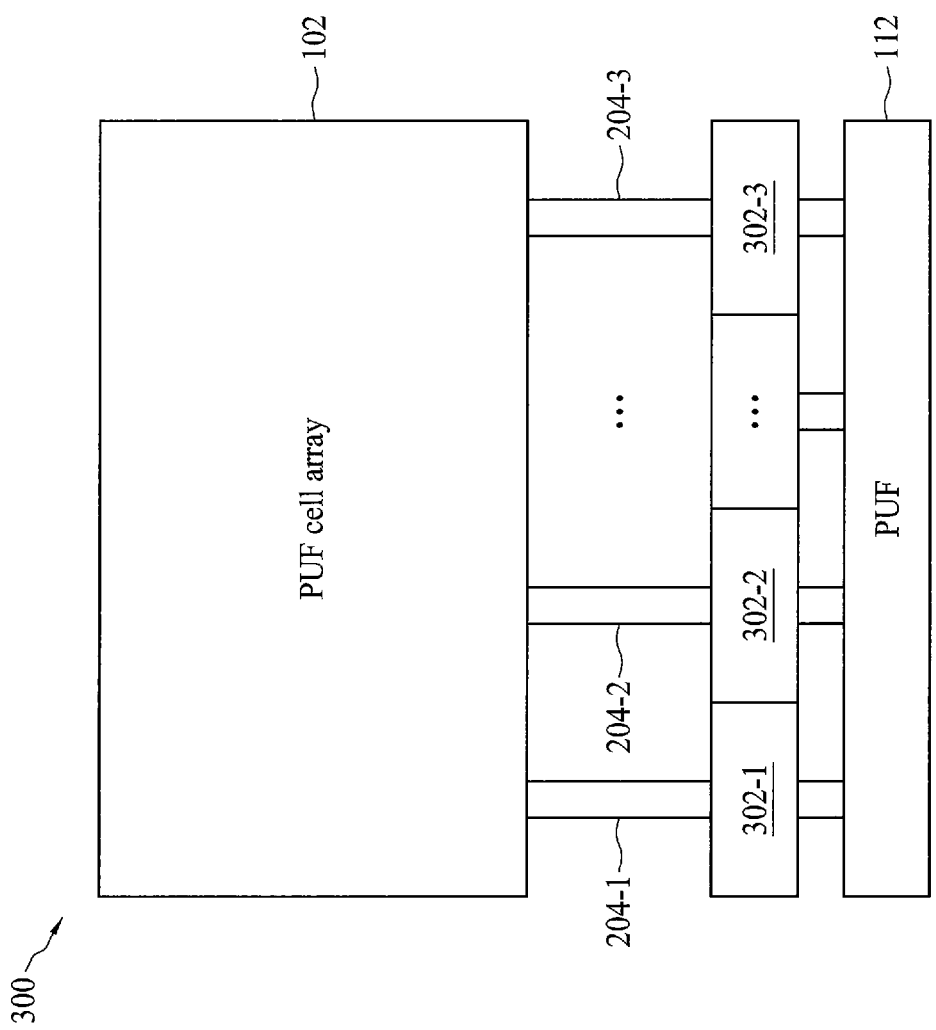
FIG. 3A illustrates an exemplary block diagram of a PUF cell array with a ring oscillator for noise injection to power lines of the PUF cell array, in accordance with some embodiments of the present disclosure.

FIG. 3A illustrates an exemplary block diagram of a PUF cell array 102 with ring oscillators 302 as a noise injector, in accordance with some embodiments of the present disclosure. It should be noted that for purposes of clarity of illustration, additional components and signal lines in the PUF generator is omitted. In some embodiment, the ring oscillators 302 are used for noise injection to power lines of the PUF cell array 102. In some embodiments, the ring oscillators 302 can be fabricated on the same chip with the bit cells 201 in the PUF cell array 102. As discussed in further detail below in FIG. 3B, in some embodiments, the ring oscillators 302 each comprises an odd number of NOT gates (i.e., inverting amplifiers) in a ring, providing an output which oscillates between two voltage levels, i.e., high and low. In some embodiments, there are at least one ring oscillator 302 coupled to a power supply voltage 204 and a zero voltage reference 205 of each column of the PUF cell array 200, which are further coupled to the PUF control circuit 112. Specifically, a first ring oscillator 302-1 is coupled between a power supply voltage 204-1 and a zero voltage reference 205-1; a second ring oscillator 302-2 is coupled between a power supply voltage 204-2 and a zero voltage reference 205-2; and a third ring oscillator 302-3 is coupled between a power supply voltage 204-3 and a zero voltage reference 205-3.

Figure 3B:
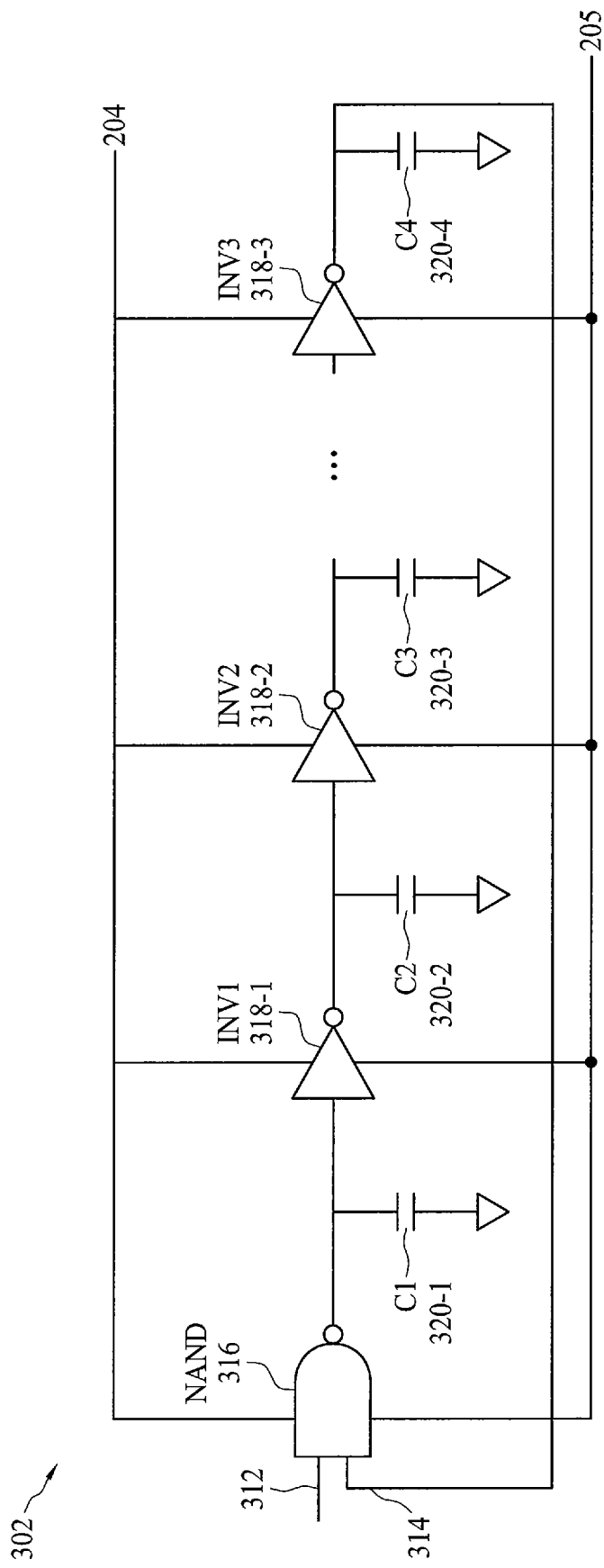
FIG. 3B illustrates an exemplary circuit diagram of a ring-oscillator, in accordance with some embodiments of the present disclosure.

FIG. 3B illustrates an exemplary circuit diagram of a ring oscillator 302, in accordance with some embodiments of the present disclosure. The ring oscillator 302 comprises an NAND (negative AND) gate 316 and a plurality of NOT gates 318 (i.e., 3 inverting amplifier, 318-1, 318-2, and 318-3, in the illustrated embodiment) between which there is at least one delay capacitor 320 (e.g., 4 delay capacitors 320-1, 320-2, 320-3 and 320-4 in the illustrated embodiment). In some embodiments, the NAND gate 316 and the plurality of inverting amplifier 318 are connected in series. In some embodiments, the total number of NAND gate 316 and inverting amplifier 318 is an odd number. Specifically, one of the node of the delay capacitor 320 is connected to the output of the inverting amplifier 318 and the other node of the delay capacitor 320 is coupled to ground. The NAND gate 316 and the inverting amplifiers 318 are coupled between the power supply voltage 204 and zero voltage reference 205, according to some embodiments. The output of the last inverting amplifier 318 (e.g., 318-3) is coupled to the feedback input 314 of the NAND gate 316 causing oscillation. The NAND gate 316 can be a NMOS (n-type metal-oxide-semiconductor) or a PMOS (p-type metal-oxide-semiconductor) NAND gate, according to some embodiments. In some embodiments, the NAND gate 316 and the inverting amplifier 318 comprises CMOS (complementary metal-oxide-semiconductor) devices. In some other embodiments, the NAND gate 316 and the inverting amplifier 318 in a ring oscillator 302 may comprise other type of transistors, for example a bipolar junction transistor (BJT), a high-electron mobility transistor (HEMT), etc. In some embodiments, the inverting amplifiers 318 have a gain greater than 1. It should be noted although only 3 inverting amplifiers 318/delay capacitors 320 are shown in the exemplary ring oscillator 302 in FIG. 3B, any even number of inverting amplifiers 318/delay capacitors 320 can be included in the ring oscillator 302 and are within the scope of this present disclosure. Delay from each of its components, including the NAND gate 316, the inverting amplifiers 318 and delay capacitors 320 contributes to the total delay. Therefore, adding even numbers of inverting amplifiers 318/delay capacitors 320 pairs to the ring oscillator 302 increases the total delay and decreases the oscillation frequency. In some embodiments, the ring oscillator 302 does not comprises an NAND gate 316 and only comprise an odd number of inverting amplifiers 318/delay capacitor 320 pairs.

During operation, initially, input and output of the inverting amplifiers 318 are momentarily balanced at a stable point. A small output voltage can cause the inverting amplifier output to rise slightly. After passing through the delay capacitor 320, this small output voltage change will be presented to the input of the inverting amplifier. The output of the following inverting amplifier 318 changes direction opposite to the input and becomes greater in magnitude than the input. This inverted and amplified output signal propagates from the output through the rest of the delay capacitors 320 and inverting amplifiers 318 in the ring oscillator 302 and back to the input of the NAND 316 where it is inverted again. During operation, when an inverting amplifier 318 switches from logical 1 to 0, current can be drawn from the zero voltage reference 205. Similarly, when an inverting amplifier switches from logical 0 to 1, current can be drawn from the power supply voltage 204. Further, due to parasitic resistances and inductances in the power supply voltage 204 and the zero voltage reference 205, the current drawn from these power supply lines can result in oscillation of voltage levels on the power supply voltage 204 and the zero voltage reference 205 locally at each inverting amplifiers 318 of the ring oscillator 302.

Figure 3C:
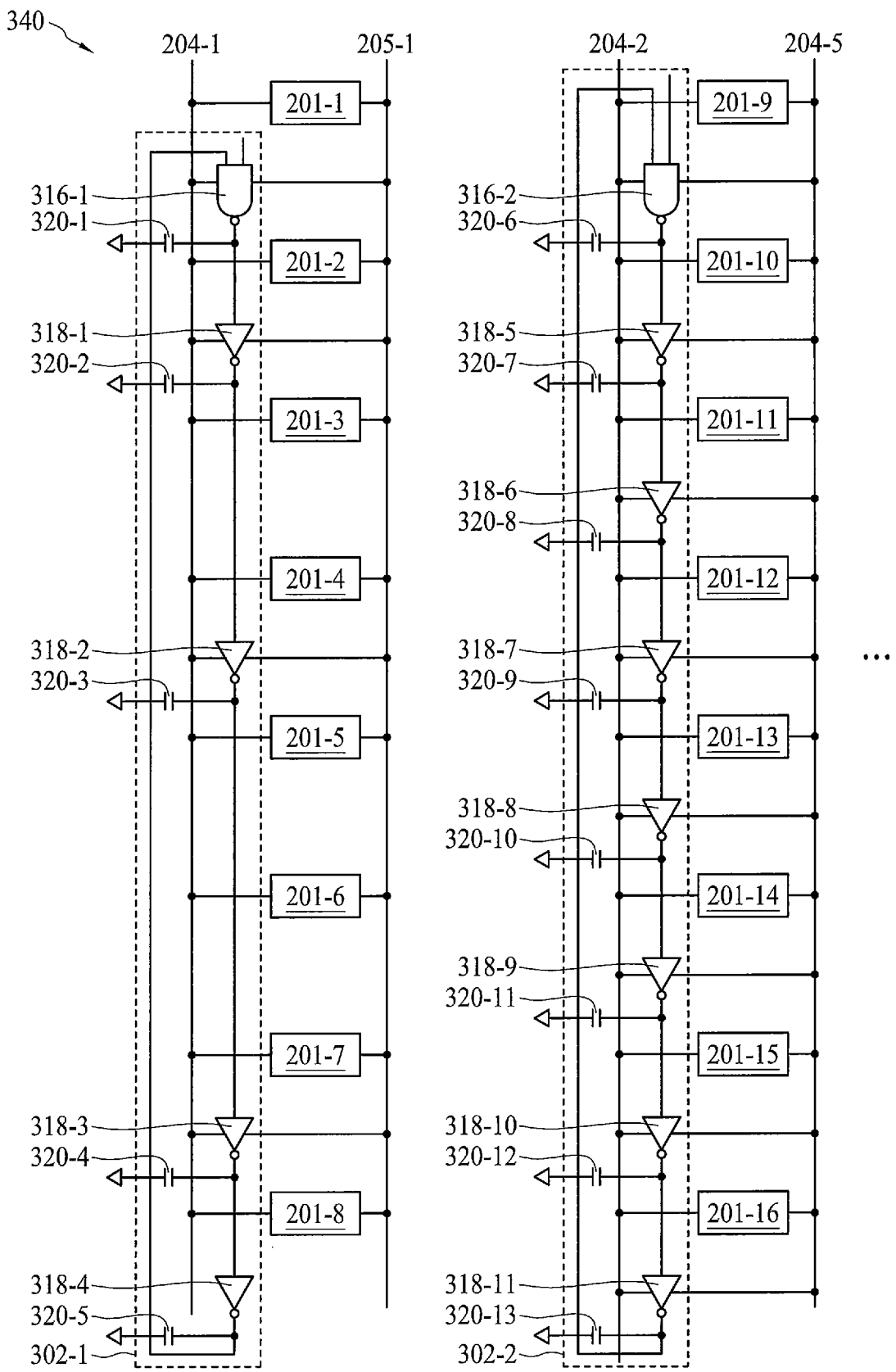
FIG. 3C illustrates an exemplary circuit diagram of a PUF cell array with ring oscillators for noise injection, in accordance with some embodiments of the present disclosure.

FIG. 3C illustrates an exemplary circuit diagram 340 of a PUF cell array 102 with a plurality of ring oscillators 302 for noise injection, in accordance with some embodiments of the present disclosure. In some embodiments, individual components (a NAND gate 316, and inverting amplifier 318/delay capacitor 320 pairs) of each of the plurality of ring oscillators 302 can be distributed in the PUF cell array 102 at locations adjacent to at least one bit cell 201 in a column of the PUF cell array 102, as oppose to one ring oscillator 302 separately located from a column of bit cells 201 in the PUF cell array 102, as shown in FIG. 3A. In some embodiments, the PUF cell array 102 comprises 2 columns of bit cells 201 (i.e., column A and column B) and each column comprises 8 bit cells. Specifically, column A of the PUF cell array 102 comprises bit cells 201-1, 201-2, 201-3, 201-4, 201-5, 201-6, 201-7 and 201-8; and column B of the PUF cell array 102 comprises bit cells 201-9, 201-10, 201-11, 201-12, 201-13, 201-14, 201-15, and 201-16. Each column has a power supply voltage line 204 and a zero voltage reference line 205. As discussed in FIG. 2, each column of bit cells also comprises a BL, a BLB and a BPC, each row of bit cells also comprises a corresponding WL, a corresponding WLB, a PUF output and a PUF output bar, which are not shown in FIG. 3C for purposes of clarity of illustration.

In the illustrated embodiment, components of the ring oscillators 302 each is configured in approximation to each of the bit cells in the column. Specifically, for example, the ring oscillator 302-1 for column A of the PUF cell array 102 comprises 1 NAND gate 316-1, 4 inverting amplifiers (i.e., 318-1, 318-2, 318-3, and 318-4), and 5 delay capacitors (i.e., 320-1, 320-2, 320-3, 320-4, and 320-5). The NAND gate 316-1 and a first delay capacitor 320-1 of the first ring oscillator 302-1 are configured between the bit cells 201-1 and 201-2. Two nodes of the first delay capacitor 320-1 are coupled to the output of the NAND gate 316-1 and ground, respectively. The first inverting amplifier 318-1 and the second delay capacitor 320-2 are configured between the bit cells 201-2 and 201-3. Two nodes of the second delay capacitor 320-2 are coupled to the output of the first inverting amplifier 318-1 and ground, respectively. The second inverting amplifier 318-2 and the third delay capacitor 320-3 are configured between the bit cells 201-4 and 201-5. Two nodes of the third delay capacitor 320-3 are coupled to the output of the second inverting amplifier 318-2 and ground, respectively. The third inverting amplifier 318-3 and the fourth delay capacitor 320-4 are configured between a seventh bit cell 201-7 and an eighth bit cell 201-8. Two nodes of the fourth delay capacitor 320-4 are coupled to the output of the third inverting amplifier 318-3 and ground, respectively. The fourth inverting amplifier 318-4 and the fifth delay capacitor 320-5 are configured between the bit cells 201-8 and 201-9 (not shown). Two nodes of the fifth delay capacitor 320-5 are coupled to the output of the fourth inverting amplifier 318-4 and ground, respectively. An output of the fourth inverting amplifier 318-4 are coupled to the other input of the NAND gate 316-1.

In the illustrated embodiment, the ring oscillator 302-2 for column B comprises 1 NAND gate 316-2, 7 inverting amplifiers (i.e., 318-5, 318-6, 318-7, 318-8, 318-9, 318-10, and 318-11), and 8 delay capacitors (i.e., 320-6, 320-7, 320-8, 320-9, 320-10, 320-11, 320-12, and 320-13). The NAND gate 316-2 and a first delay capacitor 320-6 of the second ring oscillator 302-2 are configured between the bit cells 201-9 and 201-10 of column B of the PUF cell array 102. Two nodes of the first delay capacitor 320-6 are coupled to the output of the NAND gate 316-2 and ground, respectively. A first inverting amplifier 318-5 and a second delay capacitor 320-7 of the second ring oscillator 302-2 are configured between the bit cells 201-10 and 201-11 of column B of the PUF cell array 102. Two nodes of the second delay capacitor 320-7 are coupled to the output of the first inverting amplifier 318-5 and ground, respectively. A second inverting amplifier 318-6 and A third delay capacitor 320-8 are configured between the bit cells 201-11 and 201-12 of column B of the PUF cell array 102. Two nodes of the third delay capacitor 320-8 are coupled to the output of the second inverting amplifier 318-6 and ground, respectively. A third inverting amplifier 318-7 and a fourth delay capacitor 320-9 of the second ring oscillator 302-2 are configured between the bit cells 201-12 and 201-13 of column B of the PUF cell array 102. Two nodes of the fourth delay capacitor 320-9 are coupled to the output of the third inverting amplifier 318-7 and ground, respectively. A fourth inverting amplifier 318-8 and a fifth delay capacitor 320-10 are configured between the bit cells 201-13 and 201-14 of column B of the PUF cell array 102. Two nodes of the fifth delay capacitor 320-10 are coupled to the output of the fourth inverting amplifier 318-8 and ground, respectively. A fifth inverting amplifier 318-9 and a sixth delay capacitor 320-11 are configured between the bit cells 201-14 and 201-15 of column B of the PUF cell array 102. Two nodes of the sixth delay capacitor 320-11 are coupled to the output of the fifth inverting amplifier 318-9 and ground, respectively. A sixth inverting amplifier 318-10 and a seventh delay capacitor 320-12 are configured between the seventh bit cell 201-15 and bit cell 201-16 of column B of the PUF cell array 102. Two nodes of the seventh delay capacitor 320-12 are coupled to the output of the sixth inverting amplifier 318-10 and ground, respectively. A seventh inverting amplifier 318-11 and an eighth delay capacitor 320-13 are configured between the bit cells 201-16 and 201-17 (not shown) of column B of the PUF cell array 102. Two nodes of the eighth delay capacitor 320-13 are coupled to the output of the seventh inverting amplifier 318-11 and ground, respectively. An output of the seventh inverting amplifier 318-11 are coupled to the other input of the NAND gate 316-2 of the ring oscillator 302-2.

It should be noted that FIG. 3C is merely an example and is not intend to be limiting. For example, there could be any number of bit cells 201 in a column of a PUF cell array 102 between two inverting amplifier 318/delay capacitor 320 pairs. For example, each column may have the same or different configuration of ring oscillators. For another example, there could be any number of bit cells 201 in a column of a PUF cell array 102 and any number of inverting amplifier 318/delay capacitor 320 pairs in a ring oscillator 302.

During operation, when an inverting amplifier 318 switches from logical 1 to 0, current can be drawn from the zero voltage reference 205. Similarly, when an inverting amplifier switches from logical 0 to 1, current can be drawn from the power supply voltage 204. Further, due to parasitic resistances and inductances in the power supply voltage 204 and the zero voltage reference 205, the current drawn from power supply lines can result in oscillation of voltage levels on the power supply voltage 204 and the zero voltage reference 205 locally at each inverting amplifiers 318 of the ring oscillator 302. Specifically, oscillation of voltage levels on the power supply voltage 204 and the zero voltage reference 205 locally at the at least one bit cell caused by the respective inverting amplifier 302 therefore allows the transistors in the at least one bit cell 201 to operate at a stressed operation condition (i.e., an operation condition with noise), e.g., at reduced $V_{DD}$ or at an increased $V_{SS}$. The exact voltage levels (i.e., $V_{DD}$ and $V_{SS}$) on each of the at least one respective bit cells may vary during the multiple evaluation processes in which at least one unstable bit cell is identified in order to create a mask array. Depending on the bit cell technology and timing between signals, random levels of noise can be injected to the power supply lines of bit cells every time when a PUF output from a plurality of bit cells of the PUF cell array 102 is generated.

Figure 4:
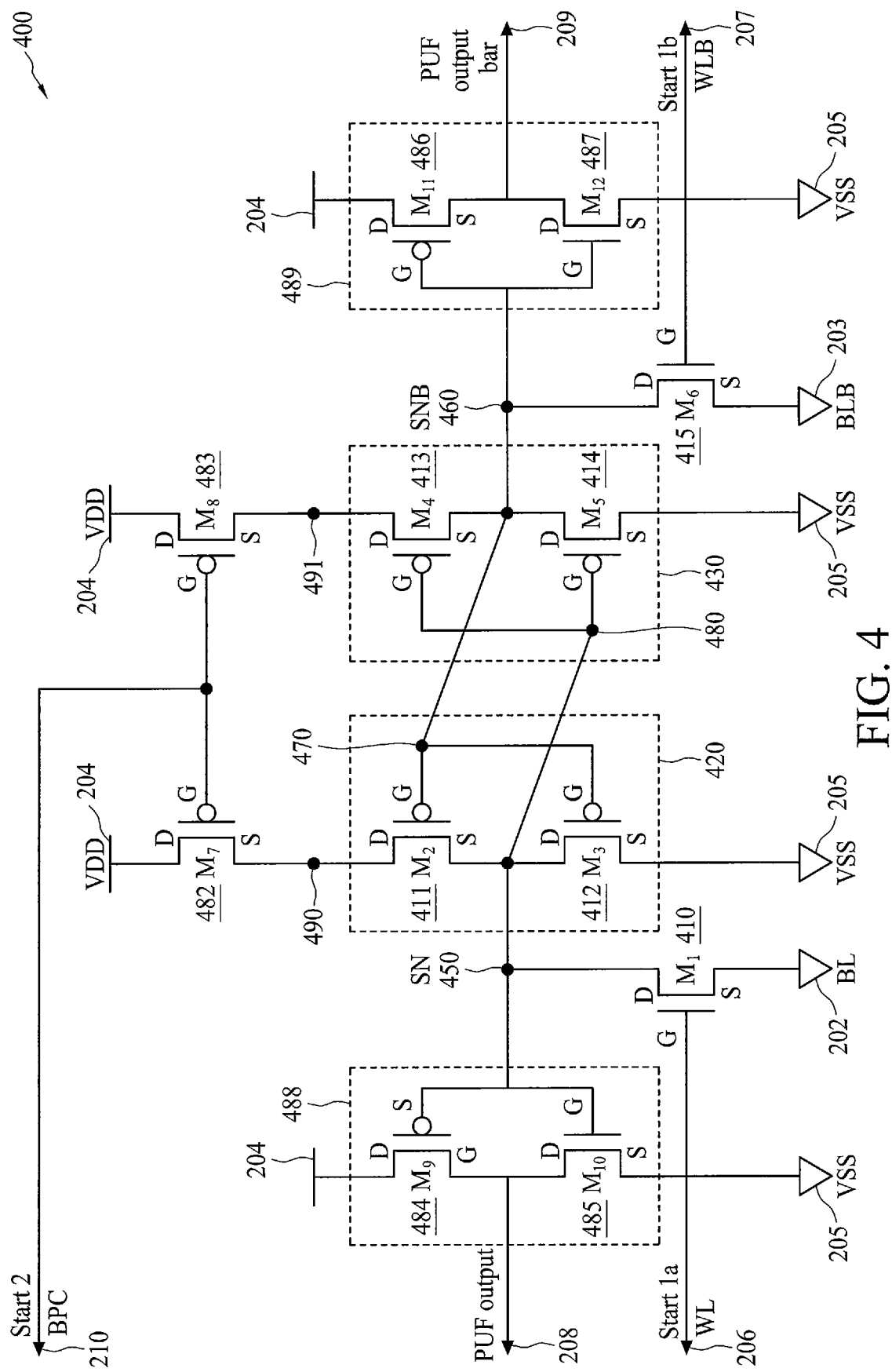
FIG. 4 illustrates an exemplary circuit diagram of a bit cell that is implemented as a 12-T SRAM bit cell with enable (EN) transistors and output inverters, in accordance with some embodiments of the present disclosure.

FIG. 4 illustrates an exemplary circuit diagram of a bit cell 400 that is implemented as a 12-T SRAM bit cell with enable (EN) transistors and output inverters, in accordance with some embodiments of the present disclosure. The bit cell 400 includes transistors: M1 410, M2 411, M3 412, M4 413, M5 414, M6 415, M7 482, M8 483, M9 484, M10 485, M11 486, and M12 487. In some embodiments, the transistors M7 482 and M8 483 are EN transistors which are also known as "in-bitcell header".

In some embodiments, the transistors M2 411 and M3 412 are formed as a first inverter 420 on the left and the transistors M4 413 and M5 414 are formed as a second inverter 430 on the right wherein the first and second inverters 420/430 are cross-coupled to each other. More specifically, source terminal of the transistor M2 411 is coupled with drain terminal of the transistor M3 412 at a storage node (SN) 450. Similarly, source terminal of the transistor M4 413 is coupled with drain terminal of the transistor M5 414 at a storage node bar (SNB) 460. Gate terminals of the transistors M2 411 and M3 412 are coupled together at node 470, while gate terminals of the transistors M4 413 and M5 414 are coupled together at node 480. Drain terminals of transistors M2 411 and M4 413 are coupled to source terminals of EN transistors M7 482 and M8 483 at nodes 490 and 491, respectively. Drain terminals of EN transistors M7 482 and M8 483 are coupled to a power supply voltage 204. Source terminals of transistors M3 412 and M5 414 are coupled to zero voltage reference 205. Gate terminals of the transistors M7 482 and M8 483 are coupled together and further electrically connected to a bit pre-charge line (BPC) 210.

Further, node 470 of the first inverter 420 is coupled to SNB 460 and node 480 of the second inverter 430 is coupled to SN 450. The transistors M1 410 and M6 415 are typically referred to as access transistors of the bit cell 200. The first inverter 420 is coupled to drain terminal of the transistor M1 410 at SN 450, and the second inverter 430 is coupled to drain terminal of the transistor M6 415 at SNB 460. In addition to being coupled to the cross-coupled inverters 420/430, the transistors M1 410 and M6 415 are both coupled to the BL 202/WL 206 and BLB 203/WLB 207, respectively. Specifically, gate terminals of the access transistors M1 410 and M6 415 are coupled to WL 206 and WLB 207, respectively; and source terminals of the access transistors M1 410 and M6 415 are coupled to BL 202 and BLB 203, respectively. In the illustrated embodiment, BL 202 and BLB 203 are coupled together to ground. In some embodiments, WL 206 and WLB 207 may be coupled together.

Further, SN 450 and SNB 460 are coupled to the PUF output 208 and PUF output bar 209 through a third invertor 488 and a fourth inverter 489, respectively. Specifically, the third inverter 488 and the fourth inverter 489 each comprises two transistors, i.e., M9 484 and M10 485 for the third inverter 488, and M11 486 and M12 487 for the fourth inverter 489. Gate terminals of transistors M9 484 and M10 485 are coupled together to SN 450 and gate terminals of transistors M11 486 and M12 487 are coupled together to SNB 460. Source terminals of transistors M9 484 and M11 486 are coupled to drain terminals of transistors M10 485 and M12 487 and further to the PUF output 208 and the PUF output bar 209, respectively. Drain terminals of transistors M9 484 and M11 486 are coupled to the power supply voltage 204. Source terminals of transistors M10 485 and M12 487 are coupled to the zero voltage reference 205.

In some embodiments, the transistors M1 410, M3 412, M5 414, M6 415, M10 485, and M12 487 each includes an NMOS transistor, and the transistors M2 411, M4 413, M7 482, M8 483, M9 484, and M11 486 each includes a PMOS transistor. Although the illustrated embodiments of FIG. 4 shows that M1-M12 are either NMOS or PMOS transistors, any of a variety of transistors or devices that are suitable for use in a memory device may be implemented as at least one of M1-M12 such as, for example, a bipolar junction transistor (BJT), a high-electron mobility transistor (HEMT), etc.

Figure 5A:
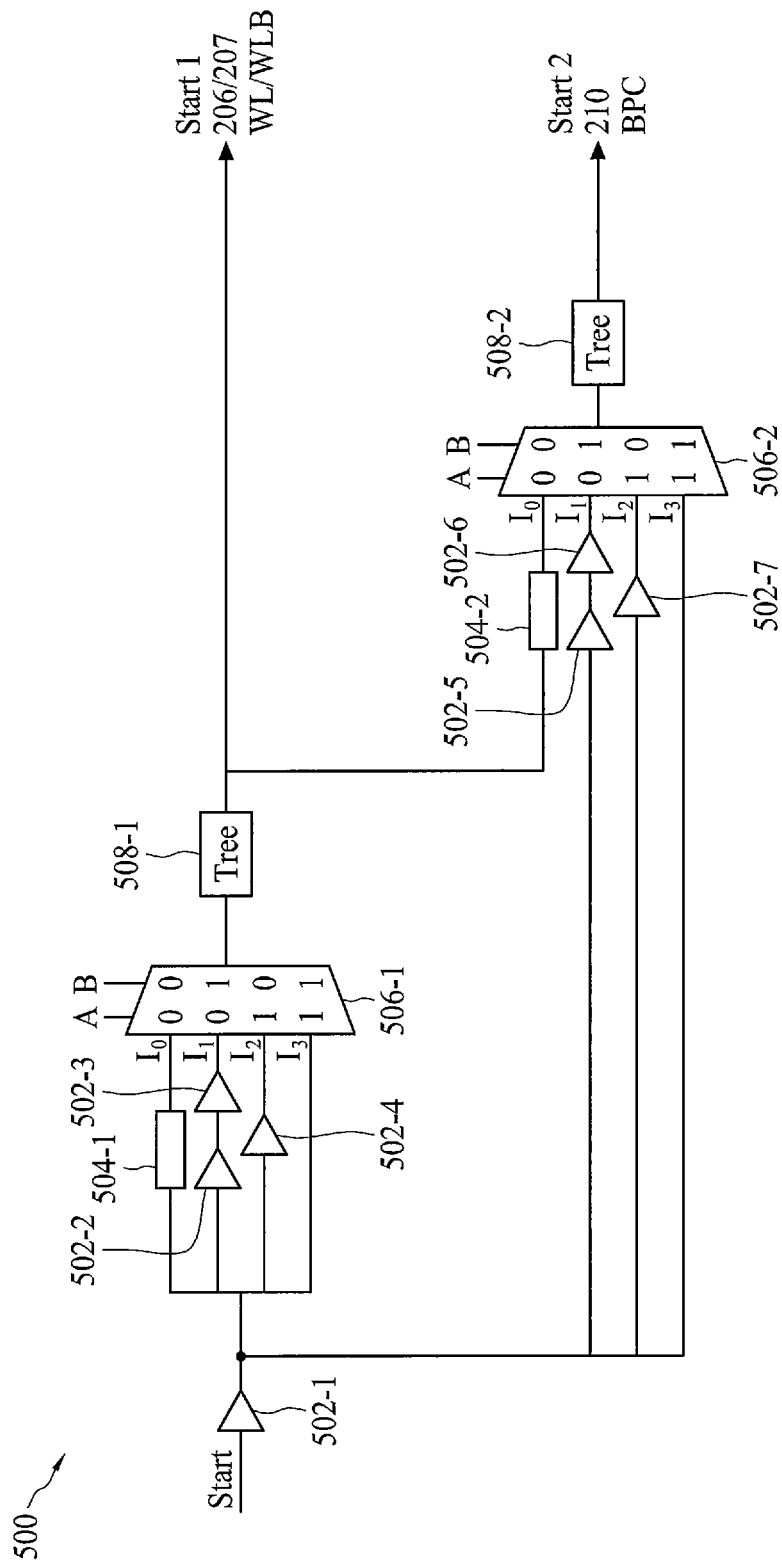
FIG. 5A illustrates an exemplary delay circuit to inject noise to internal nodes of bit cells, in accordance with some embodiments of the present disclosure

FIG. 5A illustrates an exemplary delay circuit 500 to inject noise to internal nodes of bit cells 400, in accordance with some embodiments of the present disclosure. The concept in this method is to add extra load on the load of one internal node to see if the cell has a preferred bias. If the cell still goes to a state (preferred) in light of an extra load then the cell is identified as a "strong" cell. The amount of extra load is adjusted by timing. In normal practice (operation) transistors 410 and 405 are turned off prior to turning on transistors 482 and 483 in the bit cell 400 (FIG. 4). By delaying the turning off or 401 or 405 we can identify if the PUF cell has a preferred state toward node 405 or node 460 in the illustrative circuit 400 (FIG. 4). The timing adjustment is achieved through a circuit depicted in FIG. 5A. In the illustrated embodiments, the delay circuit 500 comprises 7 delay elements 502 (e.g., 502-1, 502-2, 502-3, 502-4, 502-5, 502-6, and 502-7), 2 delay relays 504 (e.g., 504-1 and 504-2), 2 4-channel multiplexers (MUX) 506 (e.g., 506-1 and 506-2), and 2 inverter trees 508 (e.g., 508-1 and 508-2). The 4-channel MUX 506 selects one of four analog or digital inputs and forwards the selected input into an output. In some embodiments, the 4-channel MUX may comprise a plurality of inverters, AND gates and OR gates (not shown). In the illustrated embodiment, the 2 4-channel MUX each comprises 4 inputs, I0, I1, I2, I3, and 2 data select lines A and B. In some embodiments, 4 inputs, I0, I1, I2 and I3 correspond to 4 logical values on the data select lines 00, 01, 10 and 11, respectively. In some embodiments, inputs I0 of the 2 4-channel MUXs (i.e., 506-1 and 506-2) are each coupled to a delay relay 504; inputs I1 of the 2 4-channel MUXs (i.e., 506-1 and 506-2) are each coupled to two delay elements 502; inputs I2 of the 2 4-channel MUXs (i.e., 506-1 and 506-2) are each coupled to one delay element 502, and inputs I3 of the 2 4-channel MUXs (i.e., 506-1 and 506-2) each is coupled to no delay element. Further, outputs of the 2 4-channel MUXs (i.e., 506-1 and 506-2) are each coupled to one inverter tree 508. The first 4-channel MUX 506-1 and its coupled delay elements/delay relay at each input (i.e., I0, I1, I2, and I3) are further coupled to a "start" input through a delay element 502-1. Similarly, the second 4-channel MUX 506-2 and its coupled delay elements/relay at inputs I1, I2, and I3 are also coupled to the "start" input through the delay element 502-1. Input I0 of the second 4-channel MUX 506-2 and its coupled delay relay 504-2 are coupled to the output of the first inverter tree 508-1. Further, outputs from the inverter trees 508-1 and 508-2 are coupled to the WL 206/WLB 207 and BPC 210, respectively, according to the illustrated embodiment.

Figure 5B:
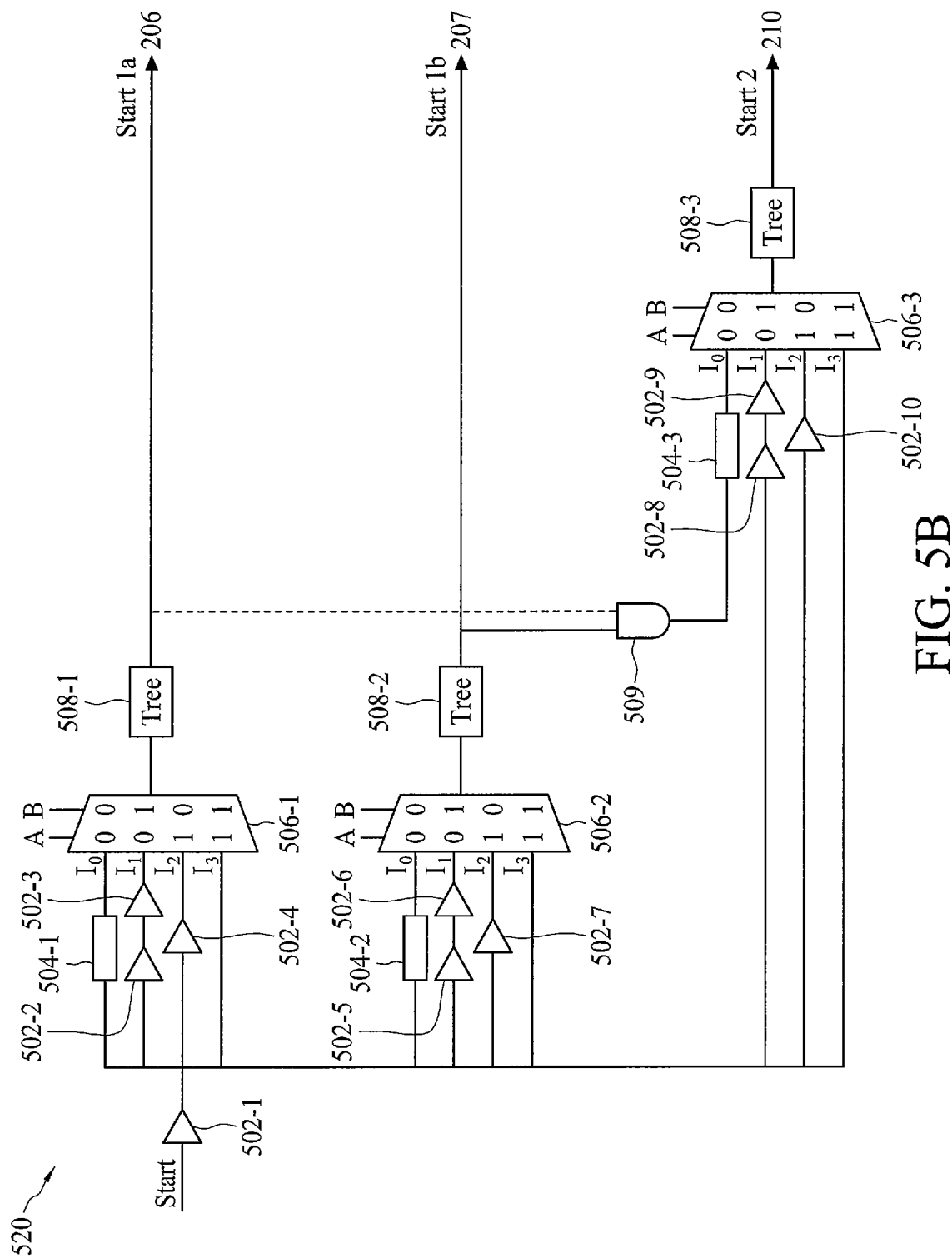
FIG. 5B illustrates an exemplary delay circuit to inject noise to internal nodes of bit cells, in accordance with some embodiments of the present disclosure.

FIG. 5B illustrates an exemplary delay circuit 520 to inject noise to internal nodes of bit cells 400, in accordance with some embodiments of the present disclosure. In the illustrated embodiments, the delay circuit 520 comprises 10 delay elements 502 (e.g., 502-1, 502-2, 502-3, 502-4, 502-5, 502-6, 502-7, 5028, 502-9, and 502-10), 3 delay relays 504 (e.g., 504-1, 504-2, and 504-3), 3 4-channel multiplexers (MUX) 506 (e.g., 506-1, 506-2, and 506-3), and 3 inverter trees 508 (e.g., 508-1, 508-2, and 508-3). Similar to FIG. 5A, the 3 4-channel MUX 506 each comprises 4 inputs, I0, I1, I2, I3 and 2 data select lines A and B, in the illustrated embodiment. In some embodiments, 4 inputs, I0, I1, I2 and I3, of each of the 4-channel MUXs 506 correspond to 4 values on the data select lines 00, 01, 10 and 11, respectively. In some embodiments, inputs I0 of the 3 4-channel MUXs (i.e., 506-1, 506-2 and 506-3) are each coupled to a delay relay 504; inputs I1 of the 3 4-channel MUXs (i.e., 506-1, 506-2 and 506-3) are each coupled to two delay elements 502; inputs I2 of the 3 4-channel MUXs (i.e., 506-1, 506-2 and 506-3) are each coupled to one delay element 502, and inputs I3 of the 3 4-channel MUXs (i.e., 506-1, 506-2 and 506-3) are each coupled to no delay element. Further, outputs of the 3 4-channel MUXs (i.e., 506-1, 506-2 and 506-3) are each coupled to an inverter tree 508-1, 508-2 and 508-3, respectively. The first and the second 4-channel MUX 506-1/506-2 and their coupled delay elements/relays are further coupled to a "start" input through a delay element 502-1. Similarly, the third 4-channel MUX 506-3 and its coupled delay elements at inputs I1, I2, and I3 are also coupled to the "start" input through the delay element 502-1. Input I0 of the third 4-channel MUX 506-3 and its coupled delay relay 504-3 are coupled to the output of the first and second inverter tree 508-1 and 508-2 through an AND gate 509, according to the illustrated embodiment. Further, outputs from the inverter trees 508-1, 508-2, and 508-3 are coupled to the WL 206, WLB 207 and BPC 210, respectively.

Figure 5C:
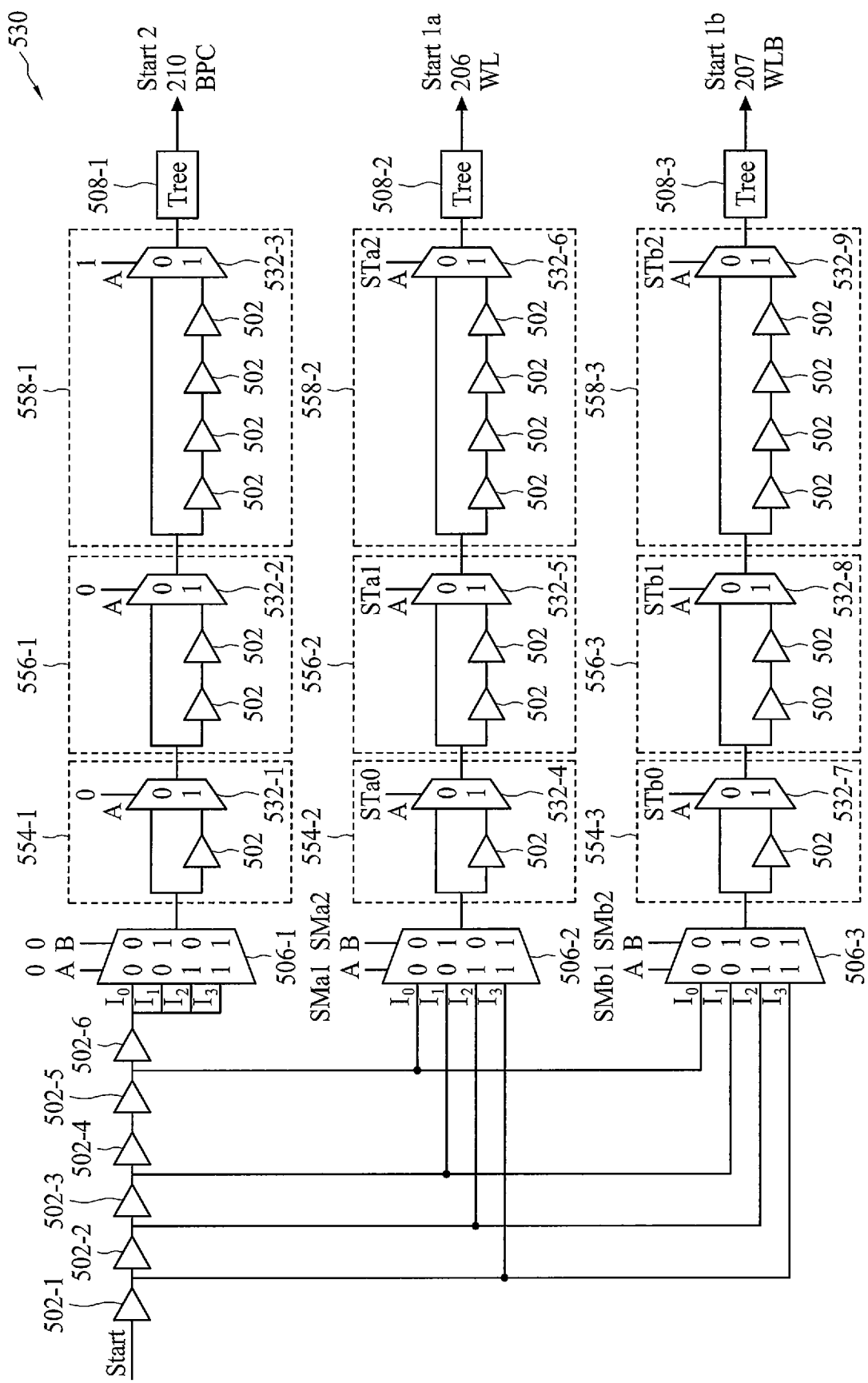
FIG. 5C illustrates an exemplary delay circuit to inject noise to internal nodes of bit cells, in accordance with some embodiments of the present disclosure.

FIG. 5C illustrates an exemplary delay circuit 530 to inject noise to internal nodes of bit cells 400, in accordance with some embodiments of the present disclosure. In the illustrated embodiments, the delay circuit 530 comprises 6 delay elements 502 (e.g., 502-1, 502-2, 502-3, 502-4, 502-5, and 502-6), 3 4-channel multiplexers (MUX) 506 (e.g., 506-1, 506-2, and 506-3), and 3 inverter trees 508 (e.g., 508-1, 508-2, and 508-3). Outputs of the 3 4-channel MUXs (i.e., 506-1, 506-2 and 506-3) are each coupled to 3 tunable delay stages 554, 556 and 558 connected in series. Specifically, a first 4-channel MUX 506-1 is coupled to a first tunable delay stage 554-1, a second tunable delay stage 556-1, and a third tunable delay stage 558-1; a second 4-channel MUX 506-2 is coupled to a fourth tunable delay stage 554-2, a fifth tunable delay stage 556-2, and a sixth tunable delay stage 558-2; and a third 4-channel MUX 506-3 is coupled to a seventh tunable delay stage 554-3, an eighth tunable delay stage 556-3, and a ninth tunable delay stage 558-3, in accordance with the illustrated embodiment.

In the illustrated embodiments, the 9 tunable delay stages 554-1, 556-1, 558-1, 554-2, 556-2, 558-2, 558-3, 554-3, and 556-3 each comprises a 2-channel MUX 532 (i.e., 532-1, 532-2, 532-3, 532-4, 532-5, 532-6, 532-7, 532-8, and 532-9). The 9 2-channel MUXs 532 each comprises 2 inputs, I0 and I1 and 1 data select line A, in the illustrated embodiment. In some embodiments, 2 inputs, I0 and I1 correspond to 2 logical values on the data select line 0 and 1, respectively. In some embodiments, inputs I0 of the 9 2-channel MUXs 532 are each coupled to zero delay element 502 and inputs I1 of the 9 2-channel MUXs 532 are each coupled to at least one delay element 502. Specifically, inputs I1 of the 2-channel MUXs 532-1, 532-4, and 532-7 are each coupled to 1 delay element 502; inputs I1 of the 2-channel MUXs 532-2, 532-5 and 532-8 are each coupled to 2 delay elements 502; and inputs I1 of the 2-channel MUXs 532-3, 532-6 and 532-9 are each coupled to 4 delay elements 502, in accordance with the illustrated embodiment. Further, inputs of the tunable delay stages 554-1, 554-2, and 554-3 are each coupled to the output of 4-channel MUXs 506-1, 506-2 and 506-3, respectively; the inputs of the tunable delay stages 556-1, 556-2 and 556-3 are each coupled to the outputs of the 2-channel MUXs 532-1, 532-4 and 532-7, respectively; and the inputs of the tunable delay stages 558-1, 558-2, and 558-3 are each coupled to the outputs of the 2-channel MUXs 532-2, 532-5 and 532-8, respectively; and the outputs of the 2-channel MUXs 532-3, 532-6 and 532-9 are each coupled to an inverter tree 508-1, 508-2 and 508-3, respectively, in accordance with the illustrated embodiment. In the illustrated embodiment, data select lines A of the 2-channel MUXs 532-1, 532-2, 532-3, 532-4, 532-5, 532-6, 532-7, 532-8, and 532-9 are each coupled to 0, 0, 1, STa0, STa1, STa2, STb0, STb1, and STb2, respectively.

Similar to FIG. 5A, the 3 4-channel MUX 506 each comprises 4 inputs, I0, I1, I2, I3 and 2 data select lines A and B, in the illustrated embodiment. In some embodiments, 4 inputs, I0, I2 and I3 correspond to 4 logical values on the data select lines 00, 01, 10 and 11, respectively. In some embodiments, inputs I0 of the 4-channel MUXs 506-2 and 506-3 are each coupled to 4 delay elements 502; inputs I1 of the 4-channel MUXs 506-2 and 506-3 are each coupled to 2 delay elements 502; inputs I2 of the 4-channel MUXs 506-2 and 506-3 are each coupled to 1 delay element 502, and inputs I3 of the 4-channel MUXs 506-2 and 506-3 are each coupled to no delay element. In the illustrated embodiments, the 4-channel MUXs 506-2 and 506-3 share the same delay elements 502. The 4-channel MUX 506-2 and 506-3, and their coupled delay elements are further coupled to a "start" input through a delay element 502. Further in the illustrated embodiment, all 4 inputs of the 4-channel MUX 506-1 are coupled to the input "start" through 6 delay elements 502. In some other embodiments, all 4 inputs of the 4-channel MUX 506-1 are grounded. Further, outputs from the inverter trees 508-1, 508-2, and 508-3 are coupled to the BPC 210, WL 206, and WLB 207, respectively.

In some embodiments, select lines of the 3 2-channel MUXs connected in series (i.e., 532-1. 532-2 and 532-3) are also coupled to an internal control circuit of a PUF block. Further, SMa1/SMa0 and SMb1/SMb0 of 4-channel MUXs 506-2 and 506-3 are coupled to the internal control circuit of the PUF block. In some other embodiments, select lines of the 6 2-channel MUXs 532-4, 532-5, 532-6, 532-7, 532-8 and 532-9 are coupled to the input ports of the PUF block in order to tune relative delays on the WL 206 and WLB 207.

FIGS. 5A-C illustrate exemplary delay circuits to inject noise to internal nodes of bit cells, in accordance with some embodiments of the present disclosure. These are, of course, merely examples and are not intended to be limiting. For example, inputs of the 2-channel MUXs 532 and 4-channel MUXs 506 may couple with different numbers of delay elements 502. For another example, the MUX may comprise a different number of inputs and select lines. In some embodiments, each delay elements comprises at least one PMOS and at least one NMOS transistors in a plurality of logic gates (e.g., inverters). In some embodiments, relative timing can be further controlled by tuning the size of transistors in each of the delay elements.

Figure 6C:
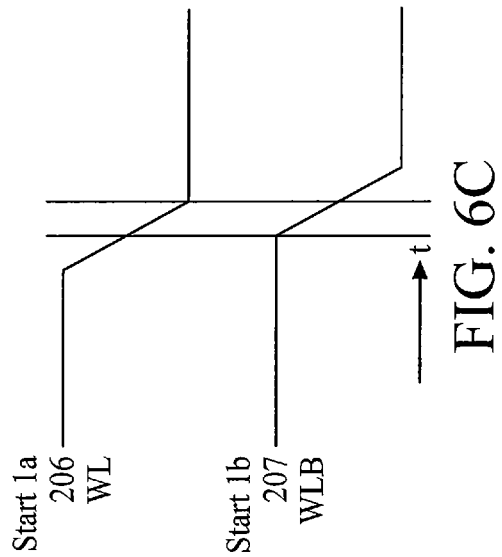
FIGS. 6A-6D illustrate waveforms of signals in bit cells of a PUF cell array to generate mask arrays and to further generate PUF signatures, in accordance with some embodiments of the present disclosure.
Figure 6D:
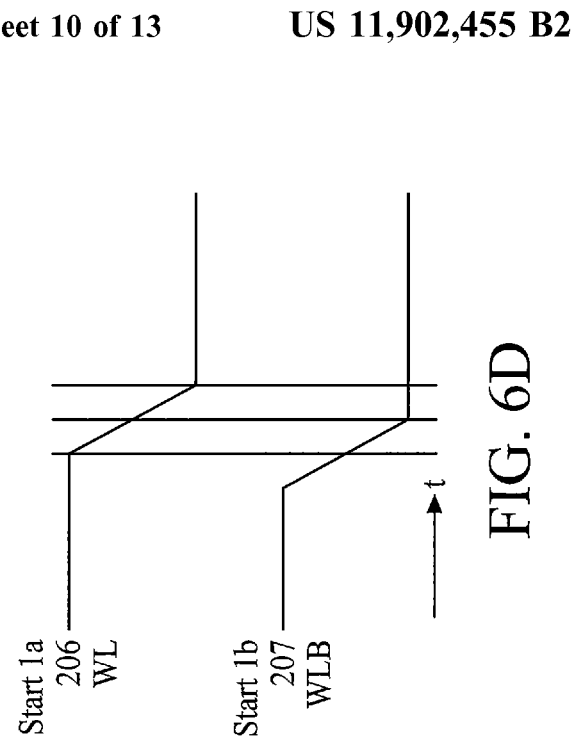
Figure 6A:
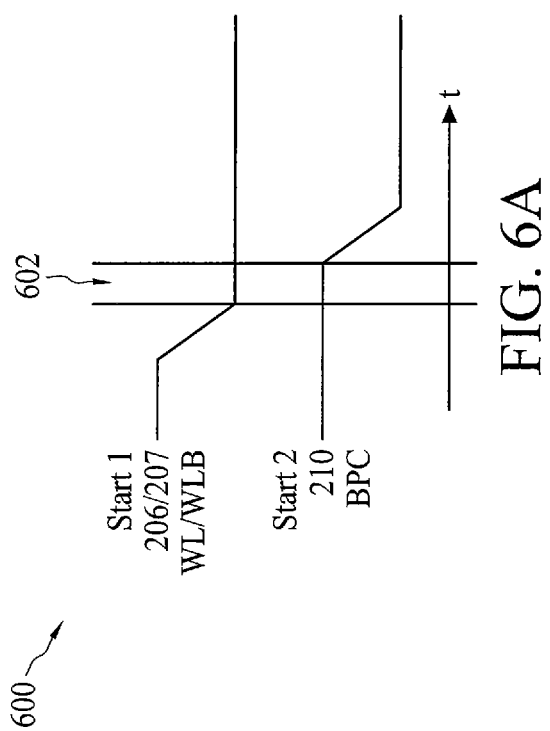

FIGS. 6A-6D illustrate waveforms 600 of signals in bit cells 400 of a PUF cell array 102 to generate a mask array and to further generate a PUF signature, in accordance with some embodiments of the present disclosure. During a normal operation to generate a PUF output as shown in FIG. 6A, when the WL 206/WLB 207 are both pulled up at the same time, the access transistors M1 410 and M6 415 are turned on, which allow a discharge of the SN 450 and SNB 460 to GND, pre-charging the bit cell with metastable logical states on the SN 450 and SNB 460. When the SN 450 and SNB 460 are pulled down to GND by turning on the access transistors M1 410 and M6 415, the two cross-coupled inverters 220/230 without a power supply allow "0"s stored on the SN 450 and SNB 460. Then, the WL 206/WLB 207 are both pulled down at the same time which turns off the access transistors M1 410 and M6 415, and the BPC 210 is then pulled down, which is separated from the end of the pulling-down of the WL 206/WLB 207 by a time gap 602, which turns on the EN transistors M7 482 and M8 483, enabling the cross-coupled inverters 420/430. The metastable logical states cannot be sustained once the cross-coupled inverters 420/430 are enabled due to its particular back-to-back configuration of the two inverters and the strength difference between the two cross-coupled inverters 420 and 430 caused by intrinsic process variations during fabrication. The small mismatch of strength in the cross-coupled inverters 420/430 will be eventually amplified by the positive feedback of the cross-coupled inverters 420/430 and will eventually generate either logic "1" or logic "0". Since the design is highly symmetric and the only randomness is caused by the fabrication process of the transistors in the cross-coupled inverters, the binary output of the logical states, when the plurality of bit cells 400 are stabilized after being enabled by the EN transistors, are unique, random and non-traceable. Finally, the logical states on SN 450 and SNB 460 are further inverted by the respective inverters 488 and 489 before read out on to the PUF output 208 and PUF output bar 209, respectively.

Figure 6B:
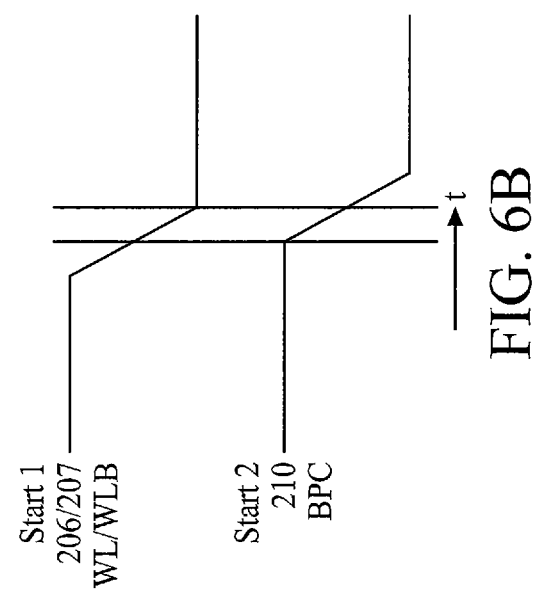

Various types of noise can be injected during an evaluation process in order to identify unstable bit cells to generate a mask array. In some embodiments, by reducing the time gap 602 and increasing the overlap between the pulling-down of the BPC 210 and the pulling-down of the WL 206/WLB 207 as shown in FIG. 6B, SN 450 and SNB 460 can add discharge pathways when the cross-coupled inverters are partially enabled by the EN transistors M7 482 and M8 483 while the access transistors are not completely turned off. The discharge pathways due to the overlap of the pulling-down of the WL 206/207 and the pulling-down of the BPC 210 provide additional randomness, i.e., asymmetric voltage values on the storage nodes. In some embodiments, the WL 206 and WLB 207 can be separately controlled. As shown in FIGS. 6C and 6D, the WL 206 may be pulled down prior to the WLB 207 is pulled down, and vice versa. Depending on the time when the BPC 210 is pulled down, asymmetry in voltage levels on the two storage nodes can be introduced and thus noise can be injected into the bit cell 400 during the evaluation process. Similarly, the logical states on the two storage nodes are further read out through the inverters 488 and 489 to the PUF output 208 and PUF output bar 209 and further to the compare circuit 122 in order to identify the unstable bit cell. The relative timing between the pulling-down signals on the WL 206, WLB 207 and the BPC 210 can be changed in a controllable fashion. Through multiple iterations by changing the relative timing between signals on these lines, unstable bit cells 400 in one or more selected rows in the PUF cell array 102 can be identified and a mask array containing addresses of the unstable bit cells can be generated. In some embodiments, relative timings on the WL 206, WLB 207 and BPC 210 are controlled by the timing control circuit 114 of the PUF generator 100, as shown in FIG. 1.

Figure 7:
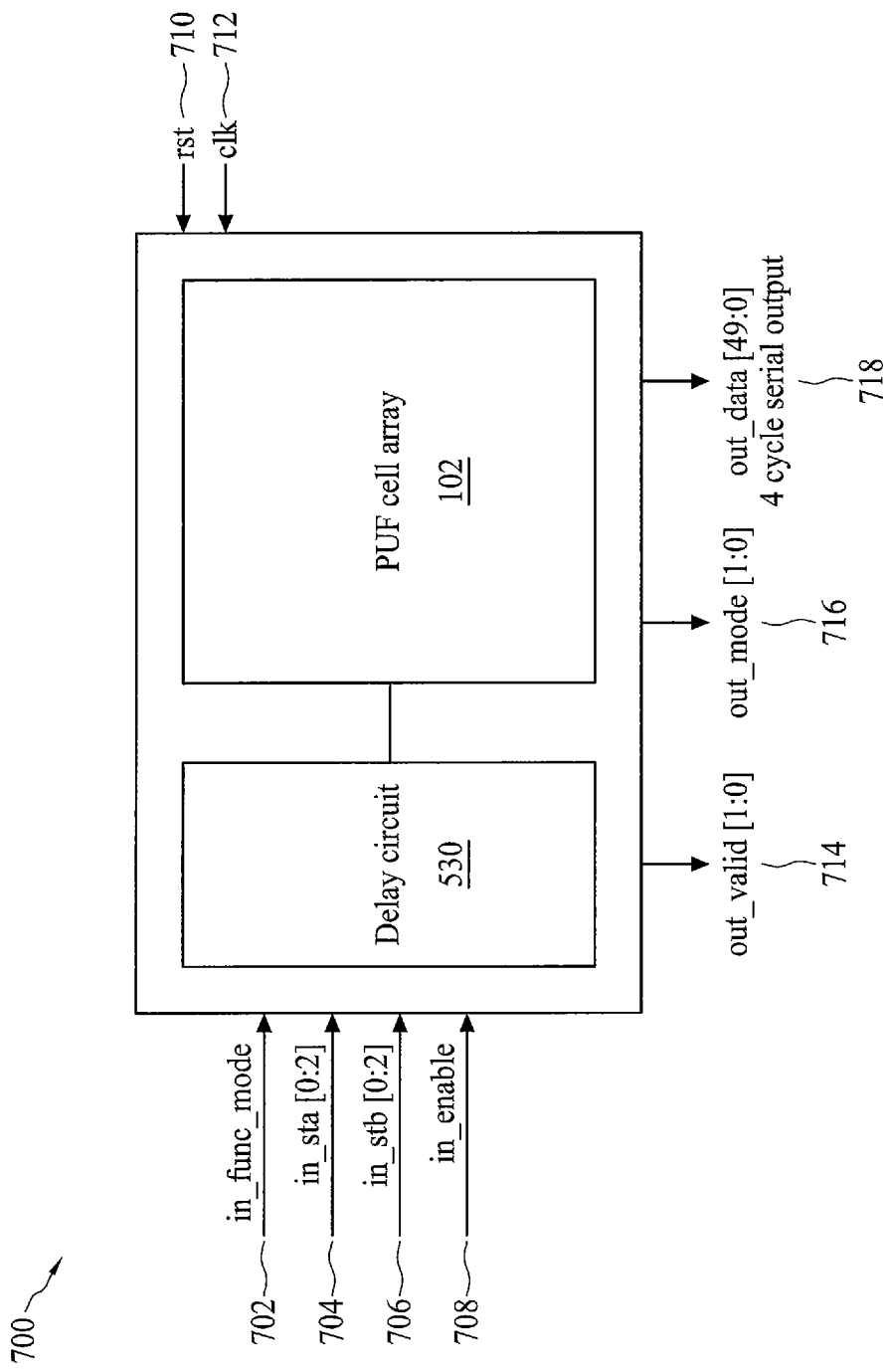
FIG. 7 illustrates an exemplary PUF block, in accordance with some embodiments of the present disclosure.

FIG. 7 illustrates an exemplary PUF block 700, in accordance with some embodiments of the present disclosure. In the illustrated embodiments, the PUF block 700 comprises 10 input ports, 53 output ports, a PUF cell array 102 with 200 bit cells, and a delay circuit 530 as shown in FIG. 5C. Specifically, the 10 input ports include 1 in_func_mode input 702, 3 in_STa input ports 704, 3 in_STb input ports 706, 1 in_enable input port 708, 1 rst input port 710, 1 clk input port 712, 1 out valid output port 714, 2 out_mode output ports 716 and 50 out_data output ports 718, according to the illustrated embodiment. Logical states "0" and "1" on the in_func_mode 702 correspond to manufacture test mode and functional mode, respectively. The 3 in_STa 704 are coupled to the respective 2-channel MUXs 532-4, 532-5 and 532-6 as shown in FIG. 5C. The 8 combination of the logical states on the 3 in_STa 704 tunes the signal delay on the WL 206 which further controls the pulling-down timing on the access transistor M1 410. Similarly, the 3 in_STb 706 are coupled to the respective 2-channel MUXs 532-7, 532-8 and 532-9 as shown in FIG. 5C. The 8 combination of the logical states on the 3 in_STb 706 tunes the signal delay on the WLB 207 which further controls the pulling-down timing on the access transistor M6 415. Logical state "1" pulse on the in_enable 708 enables all other input ports during the evaluation process and during the normal operation without noise injection logical state "0" is applied on the in_enable 708. rst 710 is to reset the PUF block 700 and clk 712 is to provide clock signal for synchronization. In some embodiments, the square pulse at the clk 712 is 1.5 nano-second.

In the illustrated embodiments shown in FIG. 7, logical state "1" on the out valid 714 indicates that the out_data ports 718 is ready with 4 cycles of serial output. Logical states "00" on the out_mode 716 is to output a masking map to the memory array (i.e., masking array); logical states "01" on the out_mode 716 suggests the output on the out_data ports 718 are raw PUF output; logical states "10" on the out-mode 716 suggests the output on the out_data ports 718 are PUF signature after filtering with the mask array; and logical states "11" on the out_mode 716 suggests the output on the out_data ports 718 are 0's. Out_data ports 718 are serial output data ports with 4 clock cycles, wherein each cycle the ports 718 output 50 outputs from 50 of the bit cells in the PUF cell array. This is, of course, merely an example and is not intended to be limiting. For example, it should be understood that the PUF block 700 may comprise any number of bit cells in the PUF cell array 102, and the delay circuit 530 may also comprise any number of 2-channel MUXs 532, which then result in different numbers of input ports and output ports, which are within the scope of this invention.

Figure 8:
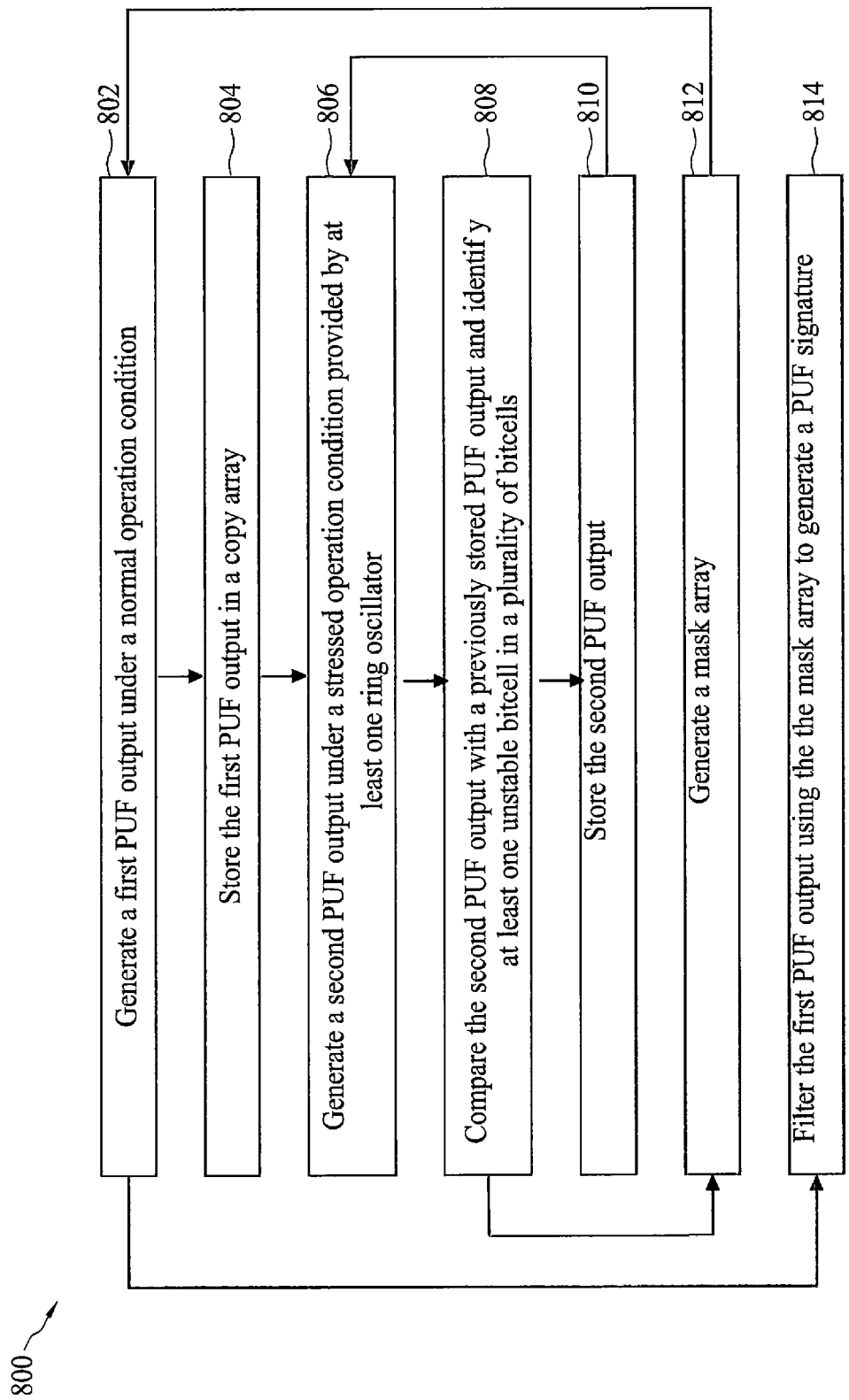
FIG. 8 illustrates a flow chart of a method to generate a PUF signature based on a PUF generator comprising a PUF cell array and at least one ring oscillator, in accordance with various embodiments of present disclosure.

FIG. 8 illustrates a flow chart of a method 800 to generate a PUF signature based on a PUF generator 100 comprising a PUF cell array 102 and at least one ring oscillator 302, in accordance with various embodiments of present disclosure. In some embodiments, the operations of method 800 are performed by the respective components illustrated in FIGS. 1-3. For purposes of discussion, the following embodiment of the method 800 will be described in conjunction with FIGS. 1-3. The illustrated embodiment of the method 800 is merely an example. Therefore, it should be understood that any of a variety of operations may be omitted, re-sequenced, and/or added while remaining within the scope of the present disclosure.

The method 800 starts with operation 802 in which a first PUF output from a plurality of bit cells 201 in a PUF cell array 102 is generated under normal operation conditions according to some embodiments. The PUF cell array 200 may include a delay-chain-based PUF generator or a memory-based PUF generator. In some embodiments, each of the bit cells of the PUF cell array 102 comprises a 14 transistors (14T-SRAM) bit cell, as shown in FIG. 4. However, the bit cells of the PUF cell array 102 may be implemented as any of a variety of types of bit cells such as, for example, 2T-2R SRAM bit cell, 4T-SRAM bit cell, 8T-SRAM bit cell, DRAM bit cell, etc, according to various embodiments of present disclosure. The operation to generate a PUF output varies according to the type and configuration of bit cells 201 used in the PUF cell array 102. For example, a PUF output can be obtained by powering off and then powering on the selected one or more rows of the PUF cell array 102, according to some embodiments.

The method 800 continues to operation 804 in which the first PUF output obtained under a normal operation condition is stored in a copy array 120. In some embodiments, the first PUF output can be stored in the copy array 120 through the I/O circuit 110. In some embodiments, the copy array 120 can be implemented with any type of on-chip memory design, including on-chip SRAMs. In some embodiments, the copy array 120 comprises on-chip memory array that contains the same number of bits as the number of bit cells in the PUF cell array 102 of the PUF generator.

The method 800 continues to operation 806 in which a second PUF output is generated under a stressed operation condition provided by at least one ring oscillator 302 according to some embodiments. In some embodiments, each of the at least one ring oscillator 302 comprises an odd number of NOT gates (i.e., inverters) in a ring, providing an output which oscillates between two voltage levels, i.e., high and low. In some embodiments, there are at least one ring oscillator 302 coupled to a power supply voltage 204 and a zero voltage reference 205 of at least one corresponding column of the PUF cell array 102, which are further connected to the PUF control circuit 112. In some other embodiments, individual components (a NAND gate 316, and inverting amplifier 318/delay capacitor 320 pairs) of each of the at least one ring oscillators 302 can be distributed in the PUF cell array 102 at locations adjacent to at least one bit cell 201 in a column of the PUF cell array as shown in FIG. 3C. During operation, when an inverting amplifier 318 in a ring oscillator 302 switches from logical 1 to 0, current can be drawn from the zero voltage reference 205. Similarly, when an inverting amplifier switches from logical 0 to 1, current can be drawn from the power supply voltage 204. Further, due to parasitic resistances and inductances in the power supply voltage 204 and the zero voltage reference 205, the current drawn from these power supply lines can result in oscillation of voltage levels on the power supply voltage 204 and the zero voltage reference 205 locally at each inverting amplifiers 318 of the ring oscillator 302. Specifically, oscillation of voltage levels on the power supply voltage 204 and the zero voltage reference 205 locally at the at least one bit cell caused by the respective inverting amplifier 302 therefore allows the transistors in the at least one bit cell 201 to operate at a stressed operation condition (i.e., an operation condition with noise), e.g., at reduced $V_{DD}$ or at an increased $V_{SS}$. The exact voltage levels (i.e., $V_{DD}$ and $V_{SS}$) on each of the at least one respective bit cells 201 may vary during the multiple evaluation processes in which at least one unstable bit cell 201 can be identified in order to create a mask array. Depending on the bit cell technology and timing between signals, random levels of noise can be injected to the power supply lines of bit cells every time when the second PUF output from a plurality of bit cells in at least one row of the PUF cell array 102 is generated.

The method 800 continues to operation 808 in which the second PUF outputs are compared to a previously stored PUF output in the copy array 120 using a compare circuit 122 and at least one unstable bit cell in a plurality of bit cells of the PUF cell array 102 is identified according to some embodiments. In some embodiments, each bit of the PUF output from the bit cells in the selected one or more rows of the PUF cell array is compared. In some embodiments, the copy array 120 stores only one PUF output. In some embodiments, the previously stored PUF output can be the first PUF output obtained under a normal operation condition. In some embodiments, a bit cell with different logical states in the first and the second PUF outputs is an unstable bit cell. In some embodiments, an address of the unstable bit cell in the PUF cell array is then stored in a mask array 124.

The method 800 continues to operation 810 in which the second PUF output is stored in the copy array 120. Before operation 812, operations 806, 808 and 810 can be repeated multiple times under different stressed operation conditions provided by the at least one ring oscillator 302 to identify unstable bit cells. The method 800 continues to operation 812 in which a mask array is generated according to the address of the at least one unstable bit cell. In some embodiments, the mask array comprises at least one bit.

The method 800 continues to operation 802 in which a PUF output under normal operation conditions is generated. The method 800 continues to operation 814 in which the PUF output is filtered by the mask array to generate a PUF signature. In some embodiments, the PUF signature is the PUF output under a normal operation condition after abandoning the at least one bit from the at least one unstable bit cells. In some embodiments, the PUF output comprises M bits and the PUF signature comprises N bit, wherein N≤M, N and M are positive integers.

Figure 9:
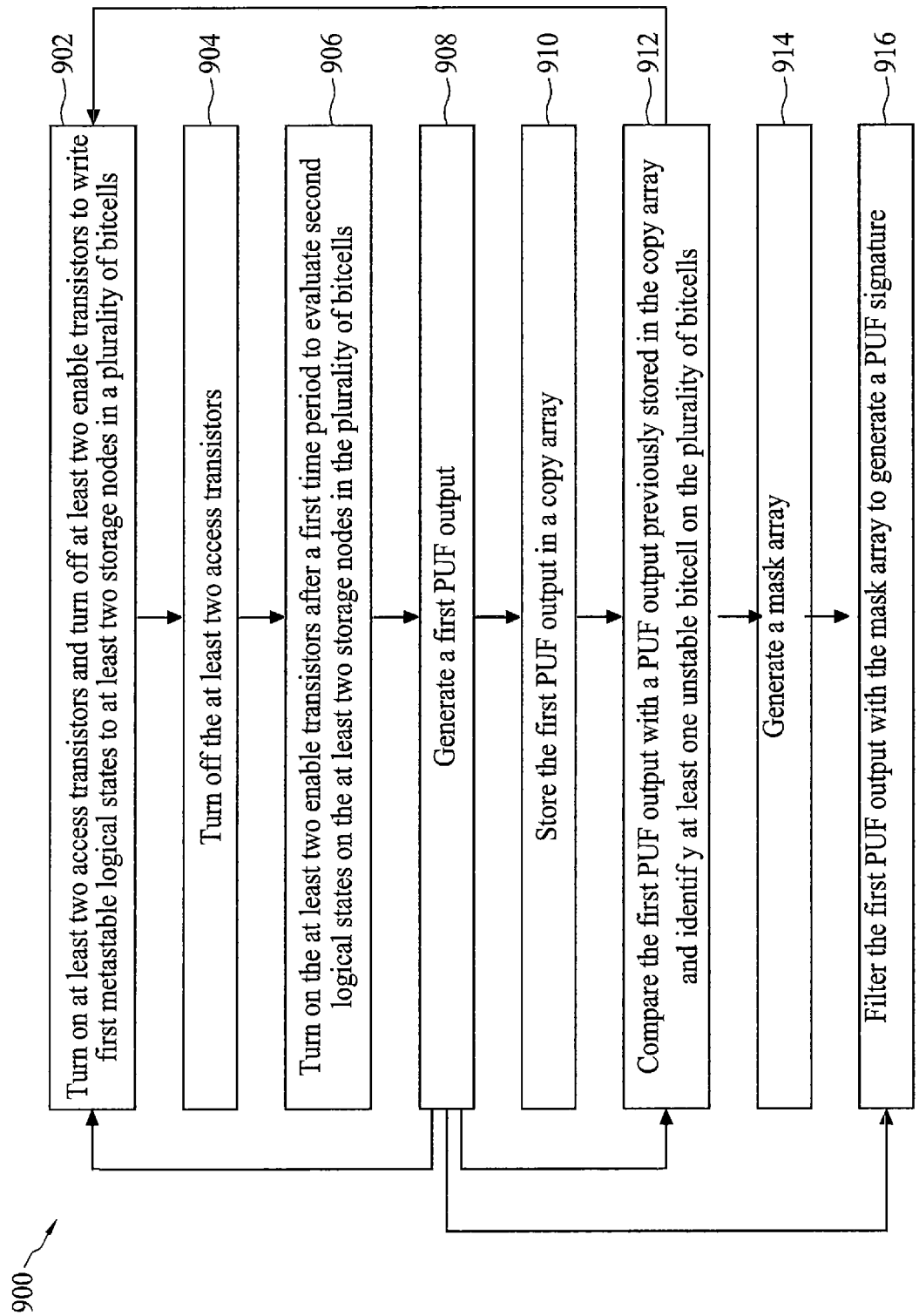
FIG. 9 illustrates a flow chart of a method to generate a PUF signature based on a PUF generator comprising a PUF cell array with a plurality of bit cells controlled by a delay circuit, in accordance with various embodiments of present disclosure.

FIG. 9 illustrates a flow chart of a method 900 to generate a PUF signature based on a PUF generator 100 comprising a PUF cell array 102 with a plurality of bit cells 400 controlled by a delay circuit, in accordance with some embodiments of present disclosure. In some embodiments, the operations of method 900 are performed by the respective components illustrated in FIGS. 1, 2 and 4-7. For purposes of discussion, the following embodiment of the method 900 will be described in conjunction with FIGS. 1, 2 and 4-7. The illustrated embodiment of the method 900 is merely an example. Therefore, it should be understood that any of a variety of operations may be omitted, re-sequenced, and/or added while remaining within the scope of the present disclosure.

The method 900 starts with operation 902 in which at least two access transistors M1 410/M6 415 are turned on and at least two enable transistors M7 482/M8 483 are turned off to write first metastable logical states to at least two storage nodes SN 450 and SNB 460 in a plurality of bit cells 400, according to some embodiments. In some embodiments, turning off the at least two enable transistors disables the cross-coupled inverters 420/430 and turning on the access transistors M1 410/M6 415 is able to write 0's on the two storage nodes SN 450 and SNB 460 coupled to the respective two access transistors.

The method 900 continues to operation 904 in which the at least two access transistors M1 410/M6 415 are turned off. In some embodiments, turning off the M1 410/M6 415 are configured by pulling down the voltage on a WL 206 and a WLB 207 which are coupled to gate terminals of the access transistors M1 410/M6 415. In some embodiments, the PUF control circuit 112 is configured to pull down the voltage on the WL 206 and WLB 207 separately with a controlled time delay. In some embodiments, the time delay between the pulling down on the WL 206 and WLB 207 is controlled by a delay circuit 520 or 530 as shown in FIGS. 5B and 5C. In some other embodiments, the WL 206 and WLB 207 are coupled together and thus pulled down by a delay circuit 510 without intentional delay.

The method 900 continues to operation 906 in which the at least two enable transistors M7 482/M8 483 are turned on after a first time delay to evaluate second logical states on the at least two storage nodes SN 450/SNB 460 in the plurality of bit cells 400. In some embodiments, the first time delay is configured by one of the delay circuits 500/520/530, as shown in FIGS. 5A-5C. In some embodiments, a normal operation condition, wherein no overlap between the pulling down of the BPC 210 and the pulling down of the WL 206/WLB 207 as shown in FIG. 6A can be configured by configuring the longest delay on the BPC 210. For example, select lines A/B of the 4-channel MUX 506-2 is configured as 0/0, as shown in FIG. 5A, wherein the two pulling-down signals on the WL 206/WLB 207 and the BPC 210 are separated by the delay elements in the delay block 504-2. Similarly, select lines A/B of the 4-channel MUX 506-3 in FIG. 5C can be configured as 0/0 to achieve the longest delay and to prevent any overlap between the pulling down of the WL 206/WLB 207 and the pulling down of the BPC 210.

The method 900 continues to operation 908 in which a first PUF output is generated. In some embodiments, the first PUF output is generated under a normal operation condition with the longest delay between the pulling-down of the WL 206/WLB 207 and pulling-down of the BPC 210.

The method 900 continues to operation 910 in which the first PUF output generated is stored in a copy array 120. In some embodiments, the first PUF output can be stored in the copy array 120 through the I/O circuit 110. In some embodiments, the copy array 120 can be implemented with any type of on-chip memory design, including on-chip SRAMs. In some embodiments, the copy array 120 comprises on-chip memory array that contains the same number of bits as the number of bit cells in the PUF cell array 102 of the PUF generator.

Before the method 900 continues to operation 912, operations 902-908 are repeated to generate a second PUF output at a reduced time gap 602 between the pulling-down signals of the WL 206/WLB 207 and the BPC 210. IN some embodiments, the reduced time gap 602 may result in an overlap between the two pulling-down signals as shown in FIG. 6B, which can create intermediate voltage levels on the two storage nodes SN 450/SNB 460, according to some embodiments. In some other embodiments, the intermediate voltage levels may be different from one another, when the WL 260 and WLB 270 are not coupled together. By applying different inputs to the multi-channel MUXs (i.e., 4-channel MUXs and 2-channel MUXs in FIGS. 5A-5C) different levels of overlaps between the pulling down signals can be created and therefore, different intermediate voltage levels on the two storage nodes SN 450/SNB 460 can be configured. A second PUF output under such "stressed" operation conditions can be then generated.

The method 900 continues to operation 912 the second PUF output generated under a stressed operation condition is then compared with the previously stored PUF output (e.g., the first PUF output generated under a normal operation condition) to identify at least one bit cell with different logical states in the tow PUF outputs. In some embodiments, each bit of the PUF output from the bit cells in the selected one or more rows of the PUF cell array 102 is compared. In some embodiments, the copy array 120 stores only one PUF output. In some embodiments, a bit cell with different logical states in the two PUF outputs is identified as an unstable bit cell. In some embodiments, an address of the unstable bit cell in the PUF cell array is then stored in a bit of a mask array 124.

Through repeated operation 902, 904, 906, 908, 910 and 912, multiple PUF outputs under stressed operation conditions by tuning the time delays using the delay circuit can be generated and compared to identify unstable bit cells 400 in the PUF cell array 102. The method 900 continues to operation 914 in which a complete mask array is generated. In some embodiments, the mask array 124 comprises an address of the at least one unstable bit cell in the plurality of bit cells of the PUF cell array 200. In some embodiments, the at least one unstable bit cell is abandoned in the final assembly of the PUF signature.

In order to generate a PUF signature, the method 900 continues with operations 902-908, in which a PUF output under a normal operation condition by configuring the longest delay between the pulling-down of the WL 206/WLB 207 and the pulling-down of the BPC 210. In some embodiments, the WL 206 and the WLB 207 are coupled together or configured with the same delay.

The method 900 continues to operation 916 in which the PUF output under a normal operation condition is filtered by the mask array 124 to generate a PUF signature. In some embodiments, the PUF output comprises M bit and the PUF signature comprises N bits, wherein $N \leq M$, N and M are positive integers. In some embodiments, the difference between M and N is the number of unstable bit cells. The above presented techniques, by injecting noise into the PUF cell array, allow quick identification of unstable bit cells, which can be then filtered out to generate a unique PUF signature.

In one embodiment, a physical unclonable function (PUF) generator includes: a PUF cell array that comprises a plurality of bit cells, wherein each of the plurality of bit cells comprises at least two access transistors, at least one enable transistor, and at least two storage nodes, wherein the at least two storage nodes are pre-configured with substantially the same voltages allowing each of the plurality of bit cells having a first metastable logical state; a PUF control circuit coupled to the PUF cell array, wherein the PUF control circuit is configured to access the plurality of bit cells to determine second logical states by turning on the at least one enable transistor and turning off the at least two access transistors of each of the plurality of bit cells, and based on the second logical states of the plurality of bit cells, to generate a PUF output; and a noise injector coupled to the PUF control circuit and the PUF cell array, wherein the noise injector is configured to create stressed operation conditions to evaluate stability of the plurality of bit cells.

In another embodiment, a method to configure a physical unclonable function (PUF) generator for generating a PUF signature, includes: writing first metastable logical states in a plurality of bit cells in a PUF cell array by charging at least two storage nodes with same voltage levels in each of a plurality of bit cells; allowing the first metastable logical states to stabilize to second logical states of the plurality of bit cells by turning off at least two access transistors and by creating stressed operation conditions in each of the plurality of bit cells of the PUF cell array; and generating a PUF signature.

Yet, in another embodiment, A physical unclonable function (PUF) generator includes: a PUF cell array that comprises a plurality of bit cells; a PUF control circuit coupled to the PUF cell array, wherein the PUF control circuit is coupled to at least one power supply voltage and at least one corresponding zero voltage reference; and at least one noise injector coupled to the PUF cell array and the PUF control circuit, wherein the at least one noise injector each is configured to introduce noise in the at least one power supply voltage and the at least one corresponding zero voltage reference.

The foregoing outlines features of several embodiments so that those ordinary skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A physical unclonable function (PUF) generator comprising:
   a PUF cell array that comprises a plurality of bit cells;
   a PUF control circuit coupled to the PUF cell array, wherein the PUF control circuit is configured to access the plurality of bit cells to determine first logical states of each of the plurality of bit cells, and based on the first logical states of the plurality of bit cells, to generate a first PUF output;
   a noise injector coupled to the PUF control circuit and the PUF cell array, wherein the noise injector is configured to introduce noise into the plurality of bit cells to cause the plurality of bit cells to have respective second logical states, wherein the PUF control circuit generates a second PUF output based on the second logical states;
   a compare circuit for comparing the second PUF output with the first PUF output; and
   a mask array for storing at least one location of at least one unstable bit cell, respectively, the at least one unstable bit cell having different states between the first and second PUF outputs; and
   a filter configured to exclude at least one logical state of the at least one unstable bit cell to generate the PUF signature.

2. The PUF generator of claim 1, wherein the plurality of bit cells each comprises at least two access transistors, at least one enable transistor, at least two storage nodes and two cross-coupled inverters, wherein the at least two storage nodes are pre-configured with substantially the same voltages allowing each of the plurality of bit cells having a first metastable logical state.

3. The PUF generator of claim 2, wherein the PUF control circuit is configured to:
   provide a first voltage and at least one second voltage to the plurality of bit cells through the delay circuit;
   turn off the at least one enable transistor and turn on the at least one two access transistors by pulling up the first voltage and the at least one second voltage, respectively, to write a first metastable logical state to each of the plurality of bit cells; and
   turn on the at least one enable transistor and turn off the at least two access transistors by pulling down the first voltage and the at least one second voltage, respectively, to allow the first metastable logical state to stabilize to the second logical state in each of the plurality of bit cells.

4. The PUF generator of claim 2, wherein the noise injector comprises a delay circuit for introducing noise into the plurality of bit cells to create stressed operation conditions under which the PUF control circuit generates the second PUF output, and wherein the at least two access transistors are coupled between the delay circuit and the at least two corresponding storage nodes.

5. The PUF generator of claim 2, wherein the at least two access transistors each comprise an NMOS transistor and the at least one enable transistor comprises a PMOS transistor.

6. The PUF generator of claim 2, wherein the PUF control circuit is configured to provide a first voltage and at least one second voltage to the plurality of bit cells through the delay circuit.

7. The PUF generator of claim 2, wherein the PUF control circuit is configured to turn off the at least one enable transistor and turn on the at least one two access transistors by pulling up the first voltage and the at least one second voltage, respectively, to write a first metastable logical state to each of the plurality of bit cells.

8. The PUF generator of claim 2, wherein the PUF control circuit is configured to turn on the at least one enable transistor and turn off the at least two access transistors by pulling down the first voltage and the at least one second voltage, respectively, to allow the first metastable logical state to stabilize to the second logical state in each of the plurality of bit cells.

9. The PUF generator of claim 2, wherein the delay circuit comprises a plurality of delay elements configured to tune signal timings of the turning on the at least one enable transistor and the turning off the at least two access transistors of each of the plurality of bit cells.

10. The PUF generator of claim 1, further comprising:
    a copy array configured to store the first PUF output.

11. The PUF generator of claim 10, wherein the PUF control circuit is coupled to at least one power supply voltage and at least one corresponding zero voltage reference.

12. A physical unclonable function (PUF) generator comprising:
    a PUF cell array that comprises a plurality of bit cells, wherein the plurality of bit cells each comprises at least two access transistors, at least one enable transistor, at least two storage nodes;
    a PUF control circuit coupled to the PUF cell array, wherein the PUF control circuit is configured to access the plurality of bit cells to determine first logical states of each of the plurality of bit cells, and based on the first logical states of the plurality of bit cells, to generate a first PUF output, wherein the PUF control circuit is coupled to at least one power supply voltage and at least one corresponding zero voltage reference;
    at least one noise injector coupled to the PUF cell array and the PUF control circuit, wherein the at least one noise injector is configured to introduce noise into the plurality of bit cells to cause the plurality of bit cells to have respective second logical states, wherein the PUF control circuit generates a second PUF output based on the second logical states;
    a compare circuit for comparing the second PUF output with the first PUF output; and
    a mask array for storing at least one location of at least one unstable bit cell, respectively, the at least one unstable bit cell having different states between the first and second PUF outputs; and
    a filter configured to exclude at least one logical state of the at least one unstable bit cell to generate the PUF signature.

13. The PUF generator of claim 12, wherein the at least two storage nodes are pre-configured with substantially the same voltages allowing each of the plurality of bit cells having a first metastable logical state.

14. The PUF generator of claim 13, wherein the at least one noise injector comprises a delay circuit for introducing noise into the plurality of bit cells to create stressed operation conditions under which the PUF control circuit generates the second PUF output, and wherein the delay circuit comprises a plurality of delay elements configured to tune signal timings of the turning on the at least one enable transistor and the turning off the at least two access transistors of each of the plurality of bit cells.

15. The PUF generator of claim 13, wherein the PUF control circuit is configured to provide a first voltage and at least one second voltage to the plurality of bit cells through the delay circuit.

16. The PUF generator of claim 12, wherein the at least two access transistors each comprise an NMOS transistor and the at least one enable transistor comprises a PMOS transistor.

17. A physical unclonable function (PUF) generator comprising:
- a PUF cell array that comprises a plurality of bit cells;
- a PUF control circuit coupled to the PUF cell array, wherein the PUF control circuit is configured to access the plurality of bit cells to determine first logical states of each of the plurality of bit cells, and based on the first logical states of the plurality of bit cells, to generate a first PUF output;
- a noise injector coupled to the PUF control circuit and the PUF cell array, wherein the noise injector is configured to introduce noise into the plurality of bit cells to cause the plurality of bit cells to have respective second logical states, wherein the PUF control circuit generates a second PUF output based on the second logical states, and wherein the noise injector comprises a delay circuit for introducing noise into the plurality of bit cells to create stressed operation conditions under which the PUF control circuit generates the second PUF output;
- a compare circuit for comparing the second PUF output with the first PUF output; and
- a mask array for storing at least one location of at least one unstable bit cell, respectively, the at least one unstable bit cell having different states between the first and second PUF outputs;
- a filter configured to exclude at least one logical state of the at least one unstable bit cell to generate the PUF signature; and
- a copy array configured to store the first PUF output, wherein the PUF control circuit is coupled to at least one power supply voltage and at least one corresponding zero voltage reference.

18. The PUF generator of claim 17, wherein the plurality of bit cells each comprises at least two access transistors, at least one enable transistor, at least two storage nodes and two cross-coupled inverters, wherein the at least two storage nodes are pre-configured with substantially the same voltages allowing each of the plurality of bit cells having a first metastable logical state.

19. The PUF generator of claim 18, wherein the at least two access transistors are coupled between the delay circuit and the at least two corresponding storage nodes.

20. The PUF generator of claim 18, wherein the at least two access transistors each comprise an NMOS transistor and the at least one enable transistor comprises a PMOS transistor.

* * * * *